(12) United States Patent
Kuo et al.

(10) Patent No.: US 9,939,942 B2
(45) Date of Patent: Apr. 10, 2018

(54) TOUCH DISPLAY PANEL

(71) Applicant: AU Optronics Corporation, Hsin-Chu (TW)

(72) Inventors: Yi-Chen Kuo, Hsin-Chu (TW); Zeng-De Chen, Hsin-Chu (TW); Ming-Yuan Tang, Hsin-Chu (TW); Chen-Hao Chiang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 190 days.

(21) Appl. No.: 15/077,963

(22) Filed: Mar. 23, 2016

(65) Prior Publication Data
US 2017/0123538 A1    May 4, 2017

(30) Foreign Application Priority Data
Nov. 2, 2015 (TW) .............................. 104135983 A

(51) Int. Cl.
G06F 3/041 (2006.01)
G06F 3/044 (2006.01)
G02F 1/1333 (2006.01)

(52) U.S. Cl.
CPC ........ G06F 3/0412 (2013.01); G02F 1/13338 (2013.01); G06F 3/044 (2013.01); G06F 3/041 (2013.01); G06F 2203/04112 (2013.01)

(58) Field of Classification Search
CPC combination set(s) only.
See application file for complete search history.

(56) References Cited

U.S. PATENT DOCUMENTS

| 7,928,450 | B2 | 4/2011 | Lin et al. |
| 8,749,515 | B2 | 6/2014 | Kim et al. |
| 2006/0231838 | A1* | 10/2006 | Kim .................. G02F 1/136213 257/59 |
| 2008/0111138 | A1* | 5/2008 | Lin ................... G02F 1/136213 257/79 |
| 2009/0174681 | A1* | 7/2009 | Chang .................. G06F 3/0412 345/173 |
| 2010/0045912 | A1* | 2/2010 | Chen .................. G02F 1/13394 349/122 |

(Continued)

Primary Examiner — Jennifer Mehmood
Assistant Examiner — Sosina Abebe
(74) Attorney, Agent, or Firm — McClure, Qualey & Rodack, LLP

(57) ABSTRACT

A touch display panel includes pixels, a first sensing line segment, a first connecting electrode and an insulating layer. The pixels are divided into a first group and a second group, and the first group includes a first region and a second region. Each pixel includes an active device, a pixel electrode and a common electrode. The first sensing line segment is disposed in a portion of the pixels of the first region. The insulating layer includes at least one first opening be adapted to expose a portion of the first sensing line segment or a portion of the first connecting electrode, and the first connecting electrode is connected to the portion of the first sensing line segment via the first opening to form a first sensing line. The common electrode at the first region is connected to the first connecting electrode, the common electrode at the second region is connected to the common electrode at the first region to form a first sensing electrode, and the common electrode at the second region is not directly connected to the first connecting electrode.

24 Claims, 18 Drawing Sheets

(56) References Cited

U.S. PATENT DOCUMENTS

| | | | |
|---|---|---|---|
| 2011/0291094 A1* | 12/2011 | Cheng | G02F 1/134363 257/59 |
| 2011/0316809 A1* | 12/2011 | Kim | G06F 3/0412 345/174 |
| 2012/0038585 A1* | 2/2012 | Kim | G06F 3/0412 345/174 |
| 2012/0050657 A1 | 3/2012 | Lin et al. | |
| 2012/0205646 A1* | 8/2012 | Cho | H01L 27/1225 257/43 |
| 2014/0009442 A1 | 1/2014 | Kim | |
| 2014/0256074 A1 | 9/2014 | Kim | |
| 2015/0021708 A1 | 1/2015 | Lin et al. | |
| 2016/0070395 A1* | 3/2016 | Hung | G09G 5/003 345/173 |
| 2016/0109994 A1* | 4/2016 | Liu | G06F 3/0412 345/174 |

* cited by examiner

TOUCH DISPLAY PANEL

CROSS-REFERENCE TO RELATED APPLICATION

The present application claims the benefit of Taiwan application TW 104135983, filed Nov. 2, 2015.

TECHNICAL FIELD

The present disclosure relates to a touch display panel, and in particular to a touch display panel integrating touch devices and a display device.

BACKGROUND

Touch sensing technology has rapidly developed in recent years, and many consumer electronic products provided with a touch function have appeared. In such products, mostly, the region of an original display panel is configured with a touch sensing function. In other words, the original simple display panel is modified into a touch display panel having a touch recognition function. According to differences between structural designs of touch display panels, they can be generally divided into out-cell and in-cell/on-cell touch display panels, in which fabrication of an additional touch panel is not required for the in-cell/on-cell touch display panels. As a result, the products have become lighter and slimmer and the manufacturing cost of the touch panels has been reduced. However, the integration of touch devices into a display panel is rather difficult and complicated, and thus there are continuing efforts in related industries to further reduce the manufacture cost and the complexity of an in-cell/on-cell touch display panel.

SUMMARY OF THE DISCLOSURE

A primary objective of the present disclosure is to provide a touch display panel in which touch devices are integrated into a display panel without adding an additional conductive layer.

In one aspect of the present disclosure, a touch display panel is provided. In certain embodiments, the touch display panel comprises a plurality of pixels, a first sensing line segment, a first connecting electrode and an insulating layer. The pixels are divided into a first group and a second group, the first group comprises a first region and a second region, the second group comprises a third region and a fourth region, each of the pixels comprises an active device, a pixel electrode and a common electrode, the active device comprises a gate electrode, a source electrode and a drain electrode, the gate electrode is connected to a scan line, the source electrode is connected to a data line, and the drain electrode is connected to the pixel electrode. The first sensing line segment is disposed in a portion of the pixels of the first region and a portion of the pixels of the third region. The insulating layer is sandwiched between the first connecting electrode and the first sensing line segment, the insulating layer comprising at least one first opening be adapted to expose a portion of the first sensing line segment or a portion of the first connecting electrode, wherein the first connecting electrode is connected to the portion of the first sensing line segment via the first opening to form a first sensing line, the common electrode at the first region is connected to the first connecting electrode, the common electrode at the second region is connected to the common electrode at the first region to form a first sensing electrode, and the common electrode at the second region is not directly connected to the first connecting electrode.

In another aspect of the present disclosure, a touch display panel is provided. In certain embodiments, the touch display panel comprises a plurality of pixels, a first sensing line and an insulating layer. The pixels are divided into a first group and a second group, the first group comprises a first region and a second region, the second group comprises a third region and a fourth region, each of the pixels comprises an active device, a pixel electrode and a common electrode, the active device comprises a gate electrode, a source electrode and a drain electrode, the gate electrode is connected to a scan line, the source electrode is connected to a data line, and the drain electrode is connected to the pixel electrode. The first sensing line is disposed in a portion of the pixels of the first region and extends through a portion of the pixels of the third region. The insulating layer is sandwiched between the first sensing line and the common electrode, and the insulating layer comprises at least one first opening be adapted to expose a portion of the first sensing line, wherein the common electrode at the first region is connected to the first sensing line, the common electrode at the second region is connected to the common electrode at the first region to form a first sensing electrode, and the common electrode at the second region is not directly connected to the first sensing line.

DETAILED DESCRIPTION OF THE DISCLOSURE

In order to assist a person of ordinary skill in the art to further understand the features and technical content of the present disclosure, reference can be made to the detailed description and accompanying drawings of the present disclosure. However, the accompanying drawings are only provided for reference and illustration, and not intended to limit the present disclosure.

Figure 1:
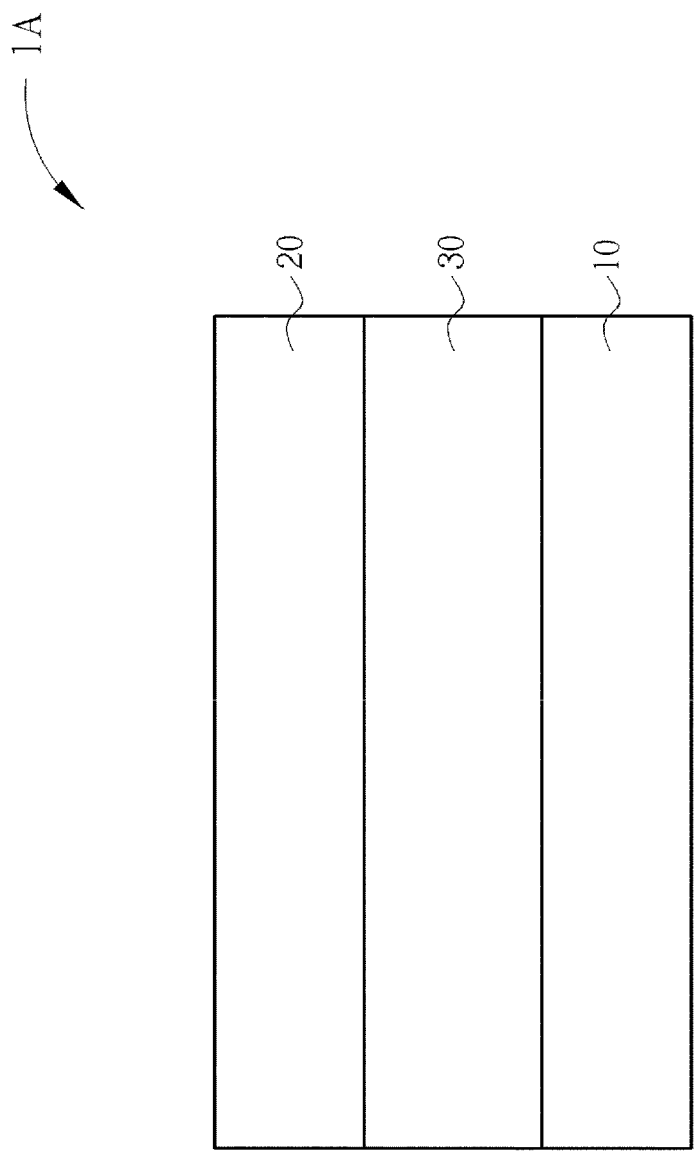
FIG. 1 shows a schematic cross-sectional view of a touch display panel according to a first embodiment of the present disclosure.

FIG. 1 shows a schematic cross-sectional view of a touch display panel according to a first embodiment of the present disclosure. As shown in FIG. 1, the touch display panel 1A of the present embodiment comprises an array substrate 10, an opposite substrate 20 and a display medium layer 30. The opposite substrate 20 is disposed opposite to the array substrate 10, and the display medium layer 30 is disposed between the array substrate 10 and the opposite substrate 20. The array substrate 10 and the opposite substrate 20 may include a glass substrate, a plastic substrate, or other suitable rigid or flexible substrates. The array substrate 10 of the present embodiment is exemplified by a glass substrate, but is not limited thereto. The array substrate 10 may selectively comprise a passive device (for example, capacitor, resistor, etc.), an alignment layer, a drive and control circuit, or other suitable devices disposed between the display medium layer 30 and the array substrate 10, and the opposite substrate 20 may selectively comprise a color filter, a black matrix, or other suitable devices disposed between the display medium layer 30 and the opposite substrate 20. However, the present disclosure is not limited thereto. In addition, at least one of the color filter and the black matrix may selectively be disposed on the array substrate 10, and thus may be referred to as a color filter on array substrate 10 (COA) or black matrix on array substrate 10 (BOA). The display medium layer 30 may be, for example, a liquid crystal layer or an electrophoresis layer, but is not limited thereto. In the present embodiment, the touch display panel 1A drives the display medium layer 30 in fringe field switching mode, but the present disclosure is not limited thereto. In other alternative embodiments, the touch display panel may drive the display medium layer 30 in in-plane switching mode or other suitable modes.

Figure 2:
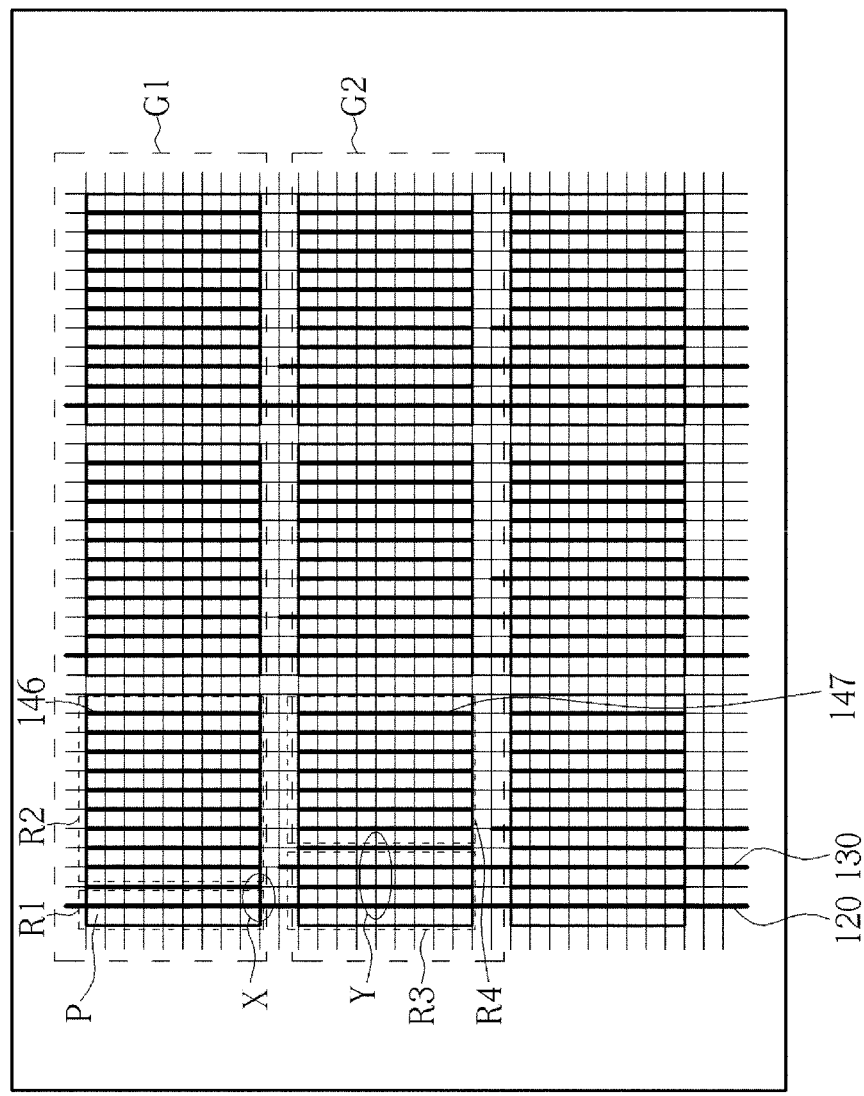
FIG. 2 shows a schematic view of sensing electrodes and sensing lines of the touch display panel according to the first embodiment of the present disclosure.
Figure 3:
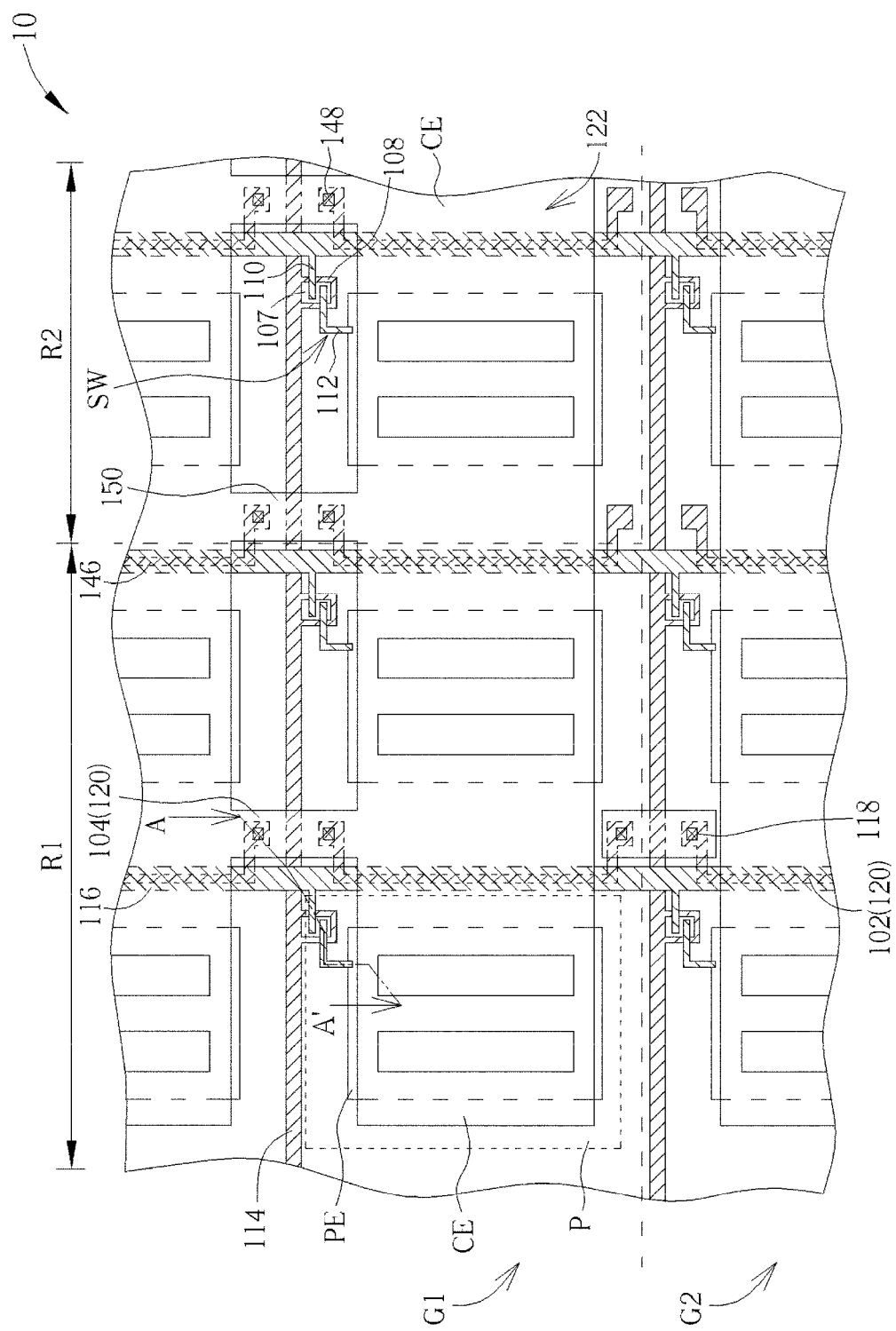
FIG. 3 shows an enlarged schematic view of an X region in FIG. 2 of an array substrate according to the first embodiment of the present disclosure.
Figure 4:
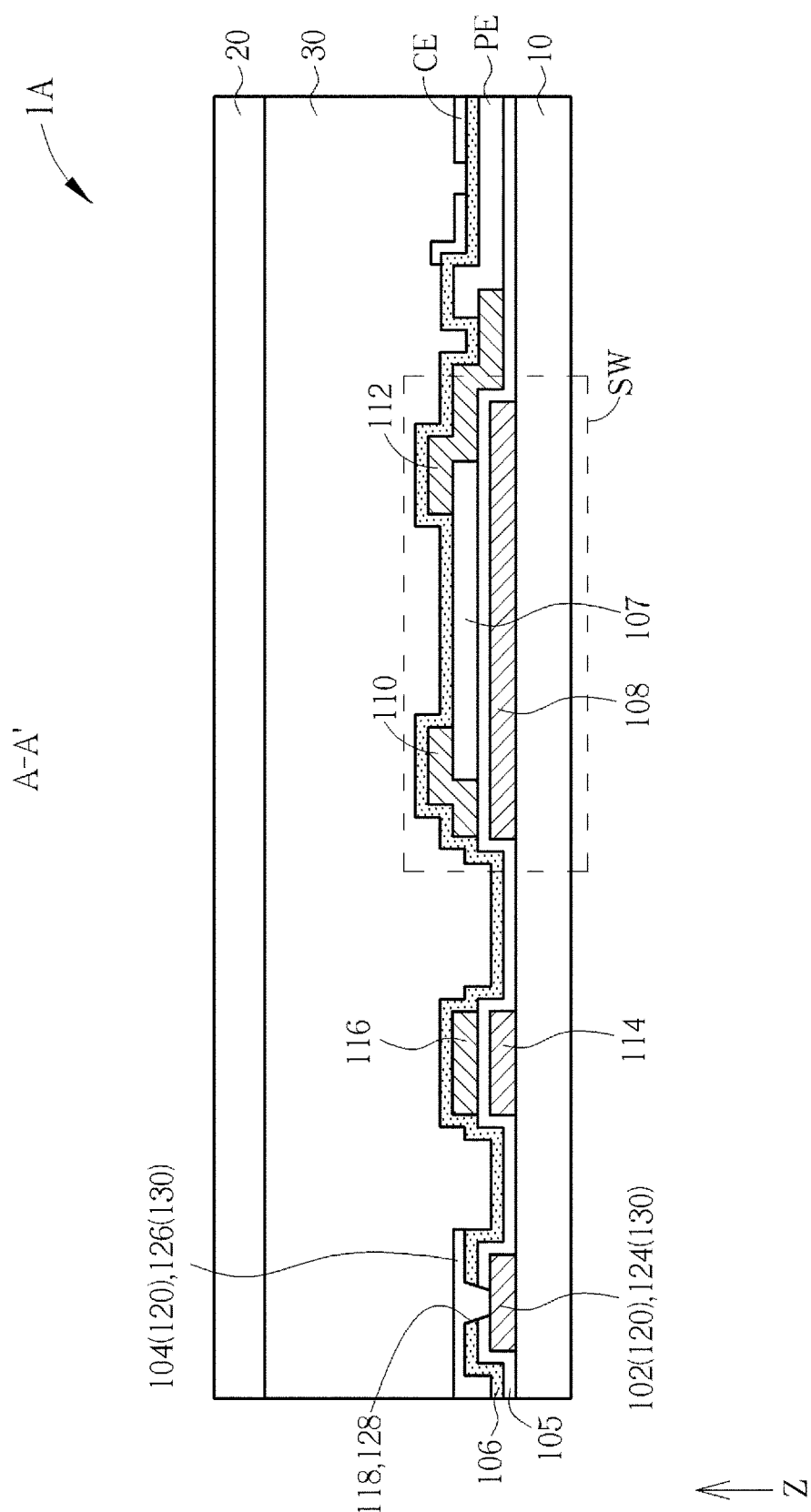
FIG. 4 shows a schematic cross-sectional view along a cut line A-A' of FIG. 3 of the array substrate according to the first embodiment of the present disclosure.
Figure 5:
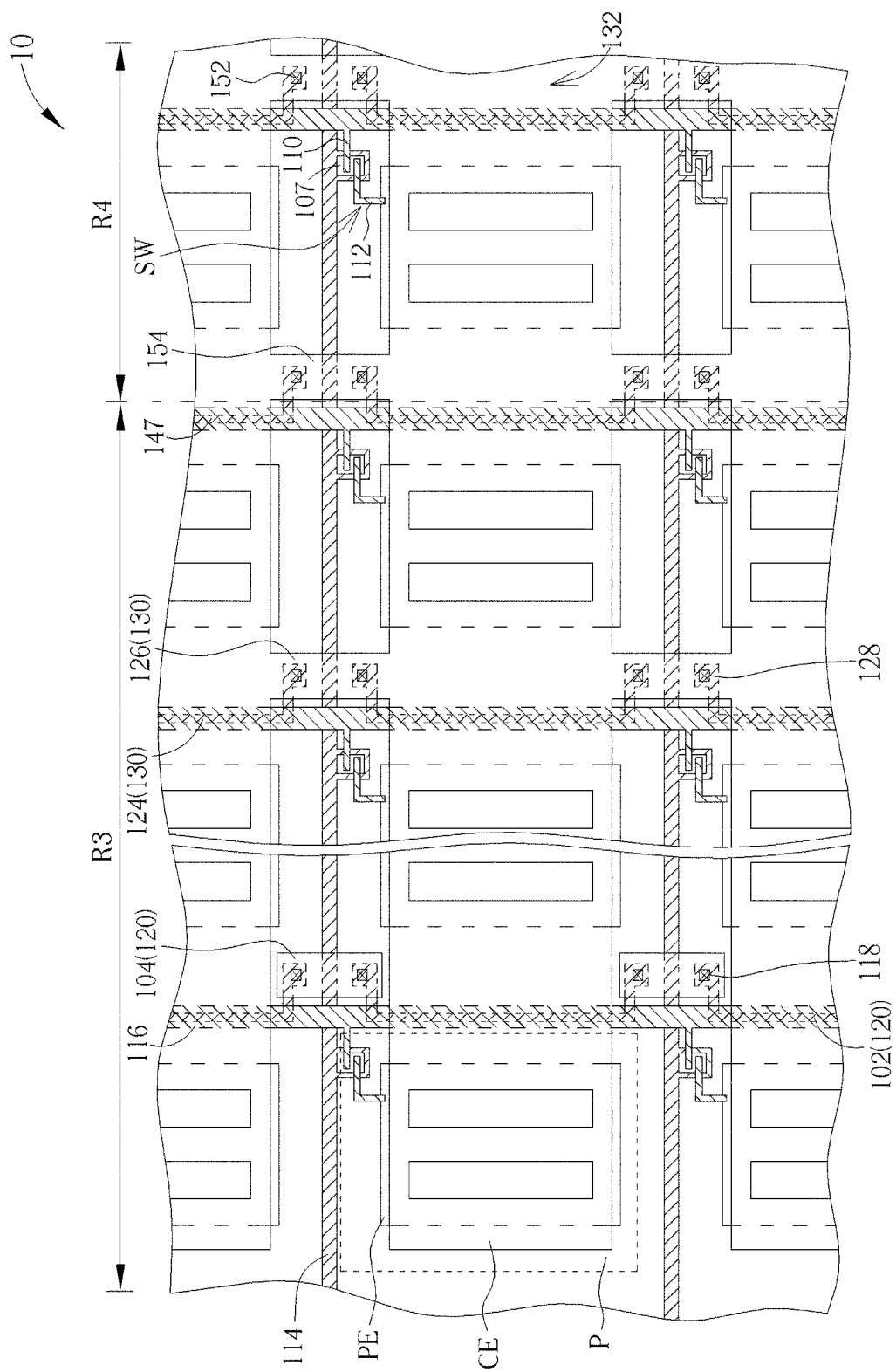
FIG. 5 shows an enlarged schematic view of a Y region in FIG. 2 of the array substrate according to the first embodiment of the present disclosure.

Referring to FIG. 2 to FIG. 5, FIG. 2 shows a schematic view of a sensing electrode and a sensing line of the touch display panel according to the first embodiment of the present disclosure, FIG. 3 shows an enlarged schematic view of an X region in FIG. 2 of an array substrate according to the first embodiment of the present disclosure, FIG. 4 shows a schematic cross-sectional view along a cut line A-A' of FIG. 3 of the array substrate according to the first embodiment of the present disclosure, and FIG. 5 shows an enlarged schematic view of a Y region in FIG. 2 of the array substrate according to the first embodiment of the present disclosure, wherein the cross-sectional view of the array substrate 10 of FIG. 4 also shows the corresponding opposite substrate 20 and the display medium layer 30.

As shown in FIG. 2 to FIG. 4, the touch display panel 1A of the present embodiment comprises a plurality of pixels P, a first sensing line segment 102, a first connecting electrode 104, and an insulating layer 106. As shown in FIG. 2, the pixels P may be disposed on the array substrate 10, and may be divided into a first group G1 and a second group G2, wherein the first group G1 has a first region R1 and a second region R2, and the second group G2 comprises a third region R3 and a fourth region R4. As shown in FIG. 3 and FIG. 4, each of the pixels comprises an active device SW, a pixel electrode PE and a common electrode CE. The active device SW may be a thin film transistor (TFT), such as an amorphous silicon TFT, a polycrystalline silicon TFT, a microcrystalline silicon TFT, a monocrystalline silicon TFT, an oxide semiconductor TFT, an organic semiconductor TFT or other semiconductor materials of TFT, and the thin film transistor may be selected from top gate TFTs, bottom gate TFTs or other types of TFTs. In the present embodiment, a bottom gate TFT is used as an example for the active device SW, and has a gate electrode 108, a source electrode 110, a drain electrode 112, an insulating layer 106, a channel layer 107, and a gate dielectric layer 105.

The gate electrode 108 is disposed on the array substrate 10 and connected to a scan line 114. The gate dielectric layer 105 is disposed on the gate electrode 108 and the array substrate 10. The channel layer 107 is disposed on the gate dielectric layer 105 and overlaps with the gate electrode 108 in a vertical projection direction Z. A material of the channel layer 107 may be selected from semiconductor layers (for example, amorphous silicon, polycrystalline silicon, microcrystalline silicon, monocrystalline silicon, or other suitable materials), oxide semiconductor layers (for example, indium gallium zinc oxide (IGZO), other suitable materials or stacks of the aforementioned materials), organic semiconductor materials, or other suitable semiconductor materials. The drain electrode 112 and the source electrode 110 are disposed on the channel layer 107 and the gate dielectric layer 105, the source electrode 110 is connected to the data line 116, and the drain electrode 112 is connected to the pixel electrode PE.

The insulating layer 106 is disposed on the drain electrode 112, the source electrode 110, the channel layer 107, the gate dielectric layer 105, and the pixel electrode PE, and the common electrode CE is disposed on the insulating layer 106. Materials of the insulating layer 106 and the gate dielectric layer 105 may include inorganic insulating materials, organic insulating materials, or stacks of the aforementioned materials. The inorganic insulating materials may be for example silicon oxide, silicon nitride, silicon oxynitride, other suitable materials, or stacks of the aforementioned materials, and the organic insulating materials may be for example acrylic, photoresists, epoxies, other suitable materials, or stacks of the aforementioned materials. The pixel electrode PE and the common electrode CE may be transparent electrodes, such as indium tin oxide (ITO) electrodes, other suitable materials, or stacks of the aforementioned materials. In other embodiments, a top gate TFT is used as an example for the active device SW. In this case, the channel layer 107 is disposed below the gate electrode 108 and the gate dielectric layer 105 is disposed between the channel layer 107 and the gate electrode 108, and the other components are not repeatedly described.

As shown in FIG. 3 and FIG. 4, the first sensing line segment 102 is disposed in a portion of the pixels P of the first region R1, and the insulating layer 106 is sandwiched between the first connecting electrode 104 and the first sensing line segment 102. The insulating layer 106 comprises at least one first opening 118 for exposing a portion of the first sensing line segment 102 or a portion of the first connecting electrode 104. The first connecting electrode 104 is connected to said portion of the first sensing line segment 102 via the first opening 118 to form a first sensing line 120. In particular, the insulating layer 106 of the present embodiment is disposed above the first sensing line segment 102, the portion of the first sensing line segment 102 is exposed via the first opening 118 passing through the insulating layer 106 and the gate dielectric layer 105, and the first connecting electrode 104 is disposed on the insulating layer 106 and is connected to the exposed portion of the first sensing line segment 102.

On the other hand, the common electrode CE at the first region R1 is connected to the first connecting electrode 104, the common electrode CE at the second region R2 is connected to the common electrode CE at the first region R1 to form a first sensing electrode 122, and the common electrode CE at the second region R2 is not directly connected to the first connecting electrode 104; namely, the common electrode CE at the second region R2 is connected to the first connecting electrode 104 through the common electrode CE at the first region R1. Furthermore, a portion of the first sensing line segment 102 in the present embodiment proximal to the active device SW may have a bent shape or curved shape, and two neighboring first sensing line segments 102 are connected by the first connecting electrode 104 such that the first sensing line 120 may keep from (or namely keep away from, or avoid) the active device SW, wherein the shape of the bending is not limited. In addition, the active device SW does not exist in the first sensing line 120, or namely the first sensing line 120 does not exist the active device SW. Alternatively, for example, the first sensing line 120 may be not connected to the active device SW.

As shown in FIG. 4 and FIG. 5, the touch display panel 1A of the present embodiment further comprises a second sensing line segment 124 and a second connecting electrode 126. The second sensing line segment 124 is disposed in another portion of the pixels P of the third region R3. The insulating layer 106 is also sandwiched between the second connecting electrode 126 and the second sensing line segment 124, and the insulating layer 106 further comprises at least one second opening 128 for exposing a portion of the second sensing line segment 124 or a portion of the second connecting electrode 126. The second connecting electrode 126 is connected to said portion of the second sensing line segment 124 via the second opening 128 to form a second sensing line 130. In particular, the insulating layer 106 of the present embodiment is disposed above the second sensing line segment 124, the portion of the second sensing line segment 124 is exposed via the second opening 128 passing through the insulating layer 106 and the gate dielectric layer 105, and the second connecting electrode 126 is disposed on the insulating layer 106 and is connected to the exposed portion of the second sensing line segment 124. The relative positions of the second sensing line segment 124, the second connecting electrode 126 and the insulating layer 106 may be substantially the same as those of the first sensing line segment 102, the first connecting electrode 104 and the insulating layer 106, as can be referred to in FIG. 4.

As shown in FIG. 5, the common electrode CE at the third region R3 is connected to the second connecting electrode 126, the common electrode CE at the fourth region R4 is connected to the common electrode CE at the third region R3 to form a second sensing electrode 132, and the common electrode CE at the fourth region R4 is not directly connected to the second connecting electrode 126; namely, the common electrode CE at the fourth region R4 is connected to the second connecting electrode 126 through the common electrode CE at the third region R3. In addition, the first sensing electrode 122 is not connected to the second sensing electrode 132; namely, the first sensing electrode 122 and the second sensing electrode 132 are separate from each other, and the first sensing line 120 is not connected to the second sensing line 130; namely, the first sensing line 120 and the second sensing line 130 are separate from each other, and the common electrode CE at the third region R3 is not connected to the first sensing line 120. On the other hand, a portion of the second sensing line segment 124 in the present embodiment proximal to the active device SW may have a bent shape or curved shape, and two neighboring second sensing line segments 124 are connected by the second connecting electrode 126 such that the second sensing line 130 may keep from (or namely keep away from, or avoid) the active device SW, wherein the shape of the bending is not limited. In addition, the active device SW does not exist in the second sensing line 130, or namely the second sensing line 130 does not exist the active device SW. Alternatively, for example, the second sensing line 130 may be not connected to the active device SW.

It is also to be noted that, in the present embodiment, the first sensing line segment 102, the second sensing line segment 124 and the scan line 114 are in the same conductive-pattern layer (for example, a first conductive-pattern layer), and neither the first sensing line segment 102 nor the second sensing line segment 124 is connected with the scan line 114; namely, the first sensing line segment 102, the second sensing line segment 124 and the scan line 114 are separate from each other. In particular, the first sensing line segment 102 and the second sensing line segment 124 may be not connected to each other; namely, the first sensing line segment 102 and the second sensing line segment 124 are separate from each other. The first sensing line segment 102 and the scan line 114 may be not connected to each other; namely, the first sensing line segment 102 and the scan line 114 are separate from each other. The second sensing line segment 124 and the scan line 114 may be not connected to each other; namely, the second sensing line segment 124 and the scan line 114 are separate from each other.

It should be noted that, since the first sensing line 120 extends through the third region R3, the first connecting electrode 104 forming the first sensing line 120 is not connected to the common electrode CE at the fourth region R4, the common electrode CE at the third region R3 and the second connecting electrode 126; namely, the first connecting electrode 104 forming the first sensing line 120, the common electrode CE at the fourth region R4, the common electrode CE at the third region R3, and the second connecting electrode 126 are all separate from each other. Similarly, the description of other sensing lines is as described above. In addition, the first connecting electrode 104 and the second connecting electrode 126 may be in the same conductive-pattern layer as the common electrode CE, for example. However, the present disclosure is not limited thereto.

Furthermore, the data line 116 may partially overlap with or not overlap with the first sensing line segment 102 and the second sensing line segment 124 in the vertical projection direction Z, respectively. In the present embodiment, the data line 116 partially overlaps with the first sensing line segment 102 and the second sensing line segment 124 in the vertical projection direction Z as an example, and when the data line 116 partially overlaps with the first sensing line segment 102 and the second sensing line segment 124 in the vertical projection direction Z, a higher aperture ratio may be provided and a parasitic capacitance may be reduced by a driving method. For example, the data line 116, the first sensing line 120 and the second sensing line 130 may be inputted with signals of substantially the same voltage, respectively, such that the voltage differences between the data line 116 and the first sensing line 120 and second sensing line 130 are substantially zero to prevent generation of parasitic capacitance. When the data line 116 does not overlap with the first sensing line segment 102 and the second sensing line segment 124 in the vertical projection direction Z, for example, when the first sensing line segment 102 and the second sensing line segment 124 are disposed separate from the data line 116 by a distance, parasitic capacitances between the data line 116 and the first sensing line 120 and second sensing line 130 may be reduced, and thus noise is less likely to be generated.

Referring to FIG. 2, FIG. 3 and FIG. 5, the touch display panel 1A of the present embodiment may be optionally provided with a first dummy line segment 146 in a portion of the pixels P of the second region R2. The first dummy line segment 146 may be in the same conductive-pattern layer (for example, a first conductive-pattern layer) as the first sensing line segment 102, and the relative position of the first dummy line segment 146 to other devices (for example, the insulating layer 106) may be substantially similar to that of the first sensing line segment 102 to other devices, but is not limited thereto. In addition, the first dummy line segment 146 may be connected to a portion of a third connecting electrode 150 via a sixth opening 148 in the insulating layer 106, and the common electrode CE at the second region R2 is connected to the third connecting electrode 150. Similarly, the touch display panel 1A also may be selectively provided with a second dummy line segment 147 in a portion of the pixels P of the fourth region R4. The second dummy line segment 147 may be in the same conductive-pattern layer (for example, a first conductive-pattern layer) as the second sensing line segment 124, and the relative position of the second dummy line segment 147 to other devices (for example, the insulating layer 106) may be substantially similar to that of the second sensing line segment 124 to other devices, but is not limited thereto.

In addition, the second dummy line segment 147 may be connected to a portion of a fourth connecting electrode 154 via a seventh opening 152 in the insulating layer 106, and the common electrode CE at the fourth region R4 is connected to the fourth connecting electrode 154. It should be noted that, the first dummy line segment 146 is not connected to the connecting electrode at the boundary of the first group G1 and the second group G2, or in other words, the dummy line segments of the first group G1 and the second group G2 are not connected to each other, and namely are separate from each other. As such, in the present embodiment, the common electrode CE at the second region R2 may be connected to the dummy line segment through the connecting electrode in that region, the common electrode CE at the fourth region R4 may be connected to the dummy line segment through the connecting electrode in that region, and the dummy line segments may be in the same conductive-pattern layer as the first sensing line segment 102, the second sensing line segment 124 and the scan line 114, and have a material of metal, alloy or other suitable materials, or stacks of the aforementioned materials. Thus, the overall resistance of the sensing electrodes may be reduced. The provision of the dummy line segments in the present embodiment is also applicable to other embodiments and alternative embodiments of the present disclosure.

In the touch display panel 1A of the present embodiment, since the sensing lines are formed by the sensing line segments and the connecting electrodes, the sensing line segments and the scan line 114 are in the same conductive-pattern layer, and the connecting electrodes may be in the same conductive-pattern layer as the common electrode CE. In other words, for the touch display panel 1A, touch devices may be made together with the architecture of the display panel, and thus an additional conductive layer is not required for making the touch devices, thereby reducing the overall complexity and manufacture cost of the process. Moreover, direct sensing may be performed without active device SW on the sensing lines of the touch display panel 1A, whereby an increase in number of the active device SW in the touch display panel 1A may be avoided and also the overall complexity and manufacture cost of the process may be reduced. On the other hand, the shape of the sensing lines in the present embodiment may allow the sensing lines to avoid the active device SW, such that the effect of the sensing lines on the active device SW can be reduced; namely, signal interference with the active device SW from the sensing lines is avoided, thereby preventing easy turn-on and uneasy turn-off of the active device SW.

The touch display panel of the present disclosure is not limited to the aforementioned embodiments. The touch display panels according to other preferred embodiments of the present disclosure are sequentially presented below, and for ease of comparison of the embodiments and for simplification of description, similar devices are marked with same reference numbers throughout the embodiments below, and the description is mainly directed to differences of the embodiments and the similar portions are not repeatedly described.

Figure 6:
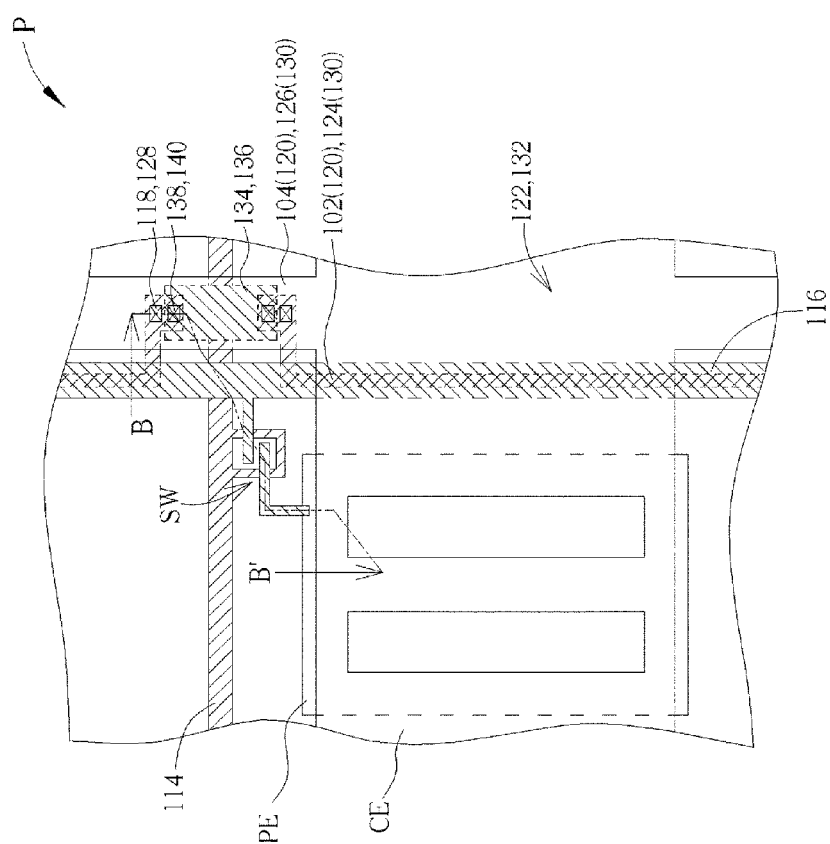
FIG. 6 shows an enlarged schematic view of pixels positioned at a first region or a second region according to a first alternative embodiment of the first embodiment of the present disclosure.
Figure 7:
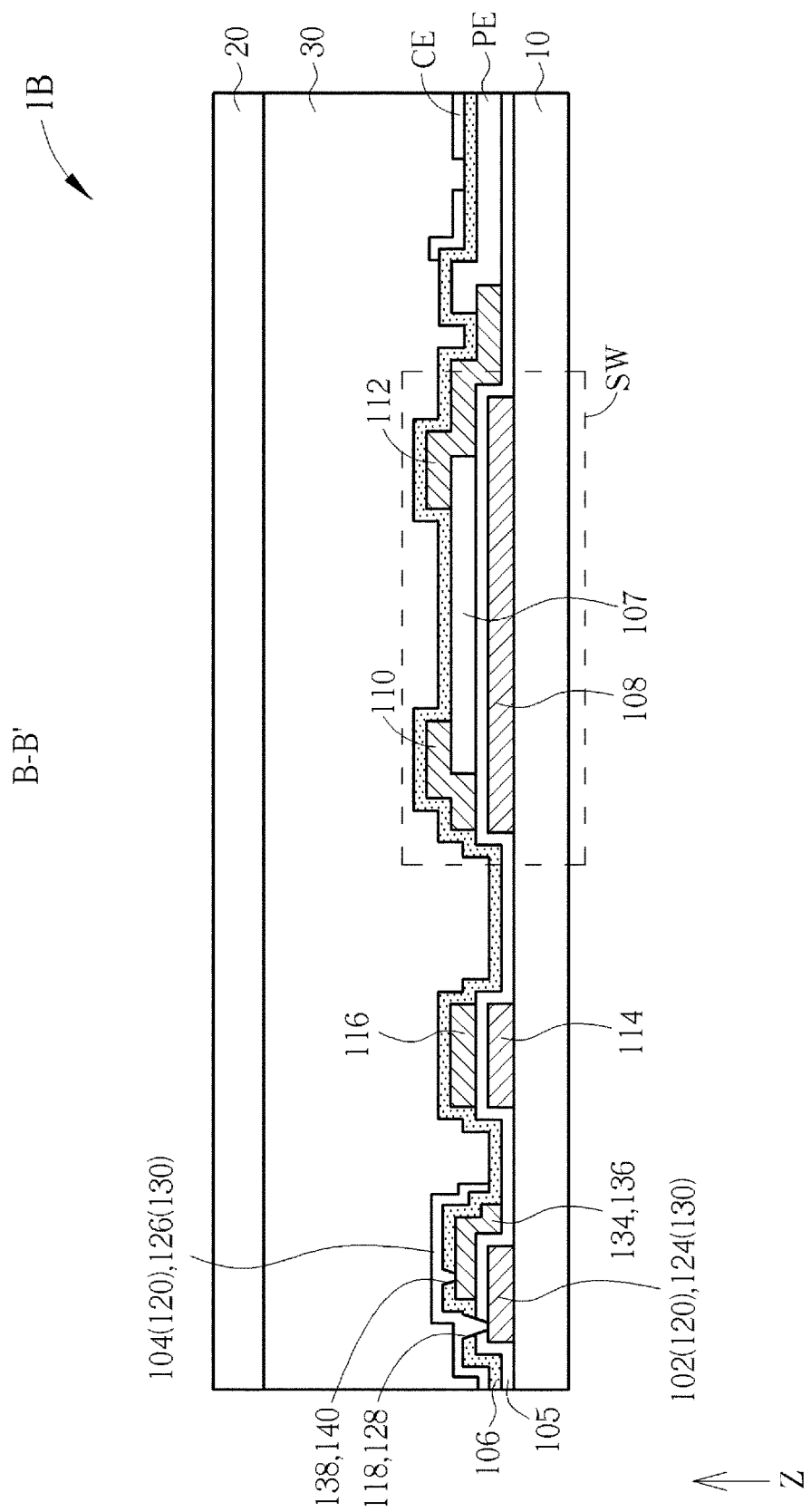
FIG. 7 shows a schematic cross-sectional view along a cut line B-B' of FIG. 6 of the array substrate according to the first alternative embodiment of the first embodiment of the present disclosure.

Referring to FIG. 6 and FIG. 7, FIG. 6 shows an enlarged schematic view of pixels positioned at a first region or a second region according to a first alternative embodiment of the first embodiment of the present disclosure, and FIG. 7 shows a schematic cross-sectional view along a cut line B-B' of FIG. 6 of the array substrate according to the first alternative embodiment of the first embodiment of the present disclosure, wherein the cross-sectional view of the array substrate 10 of FIG. 7 also shows the corresponding opposite substrate 20 and the display medium layer 30. As shown in FIG. 6 and FIG. 7, unlike the first embodiment, the touch display panel 1B of the present alternative embodiment further comprises a first auxiliary electrode (or namely first assistant electrode) 134 disposed below the insulating layer 106, and the common electrode CE at the first region R1 is connected to the first auxiliary electrode 134 through the first connecting electrode 104, and the first auxiliary electrode 134 is not connected to any of the active device SW, the scan line 114, the data line 116, and the second sensing electrode 132; namely, the first auxiliary electrode 134 is separate from the active device SW, the scan line 114, the data line 116, and the second sensing electrode 132.

The first auxiliary electrode 134 may be disposed between two adjacent first sensing line segments 102 in the first region R1 and the third region R3 and partially overlap with the first sensing line segments 102 in the vertical projection direction Z, the first auxiliary electrode 134 may at least partially overlap with the first connecting electrode 104 in the vertical projection direction Z, and the first connecting electrode 104 may be connected to the first auxiliary electrode 134 via a third opening 138 in the insulating layer 106. In addition, in other alternative embodiments, the gate dielectric layer 105 also may be provided with a contact hole (not shown) for exposing a portion of the first sensing line segment 102, and the first auxiliary electrode 134 may be connected to the first sensing line segment 102 via the contact hole (not shown). However, the present disclosure is not limited thereto. Furthermore, when the first auxiliary electrode 134 is connected to the first sensing line segment 102 via the contact hole (not shown), the first connecting electrode 104 may selectively be connected only to either the first sensing line segment 102 or the first auxiliary electrode 134, and alternatively, the first connecting electrode 104 may be connected to both the first sensing line segment 102 and the first auxiliary electrode 134. However, the present disclosure is not limited thereto.

On the other hand, the touch display panel 1B further comprises a second auxiliary electrode (or namely second assistant electrode) 136 disposed below the insulating layer 106, and the common electrode CE at the third region R3 is connected to the second auxiliary electrode 136 through the second connecting electrode 126, and the second auxiliary electrode 136 is not connected to any of the active device SW, the scan line 114, the data line 116, and the first sensing electrode 122; namely, the second auxiliary electrode 136 is separate from the active device SW, the scan line 114, the data line 116, and the first sensing electrode 122. The second auxiliary electrode 136 may be disposed between two adjacent second sensing line segments 124 in the third region R3 and partially overlap with the second sensing line segments 124 in the vertical projection direction Z, and the second auxiliary electrode 136 at least partially overlaps with the second connecting electrode 126 in the vertical projection direction Z. The second connecting electrode 126 may be connected to the second auxiliary electrode 136 via a fourth opening 140 in the insulating layer 106. In addition, the relative position of the second auxiliary electrode 136 to other devices may be the same as that of the first auxiliary electrode 134 to other devices, as can be referred to in FIG. 6 and FIG. 7.

In addition, in other alternative embodiments, the gate dielectric layer 105 also may be provided with a contact hole (not shown) for exposing a portion of the second sensing line segment 124, and the second auxiliary electrode 136 may be connected to the second sensing line segment 124 via the contact hole (not shown). However, the present disclosure is not limited thereto. Furthermore, when the second auxiliary electrode 136 is connected to the second sensing line segment 124 via the contact hole (not shown), the second connecting electrode 126 may selectively be connected only to either the second sensing line segment 124 or the second auxiliary electrode 136, and alternatively, the second connecting electrode 126 may be connected to both the second sensing line segment 124 and the second auxiliary electrode 136. However, the present disclosure is not limited thereto.

In this embodiment, the first auxiliary electrode 134, the second auxiliary electrode 136 and the data line 116 may be in the same conductive-pattern layer (for example, a second conductive-pattern layer), and the materials thereof may include, for example, metal, alloy or other suitable materials, or stacks of the aforementioned materials, but are not limited thereto. In addition, neither the first auxiliary electrode 134 nor the second auxiliary electrode 136 is connected with the data line 116; namely, the first auxiliary electrode 134, the second auxiliary electrode 136 and the data line 116 are separate from each other. In particular, the first auxiliary electrode 134 and the second auxiliary electrode 136 are not connected to each other; namely, the first auxiliary electrode 134 and the second auxiliary electrode 136 are separate from each other. The first auxiliary electrode 134 and the data line 116 are not connected to each other; namely, the first auxiliary electrode 134 and the data line 116 are separate from each other. The second auxiliary electrode 136 and the data line 116 are not connected to each other; namely, the second auxiliary electrode 136 and the data line 116 are separate from each other.

As such, the first sensing line 120 and the second sensing line 130 in the present alternative embodiment may be connected to the first auxiliary electrode 134 and the second auxiliary electrode 136 respectively, and the materials of the first auxiliary electrode 134 and the second auxiliary electrode 136 may be metal, alloy or other suitable materials, or stacks of the aforementioned materials. Thus, the overall resistance of the first sensing line 120 and the second sensing line 130 may be further reduced. It is also to be noted that, the data line 116 in the present alternative embodiment may partially overlap with or not overlap with the first sensing line segment 102 and the second sensing line segment 124 in the vertical projection direction Z, respectively, detailed implementation of which may be the same as that of the first embodiment and is not repeatedly described. Furthermore, the remaining features of the touch display panel 1B of the present alternative embodiment may be the same as those of the first embodiment (see also FIG. 1 to FIG. 5), and are not repeatedly described herein.

Figure 8:
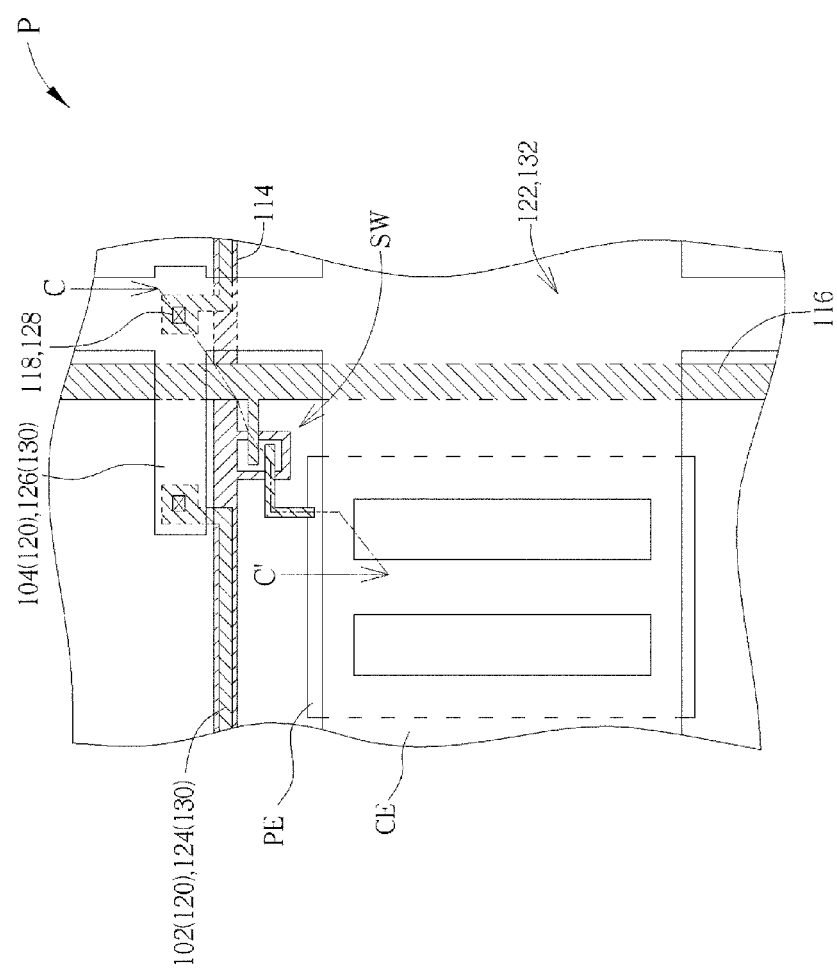
FIG. 8 shows an enlarged schematic view of the pixels positioned at the first region or the second region according to a second alternative embodiment of the first embodiment of the present disclosure.
Figure 9:
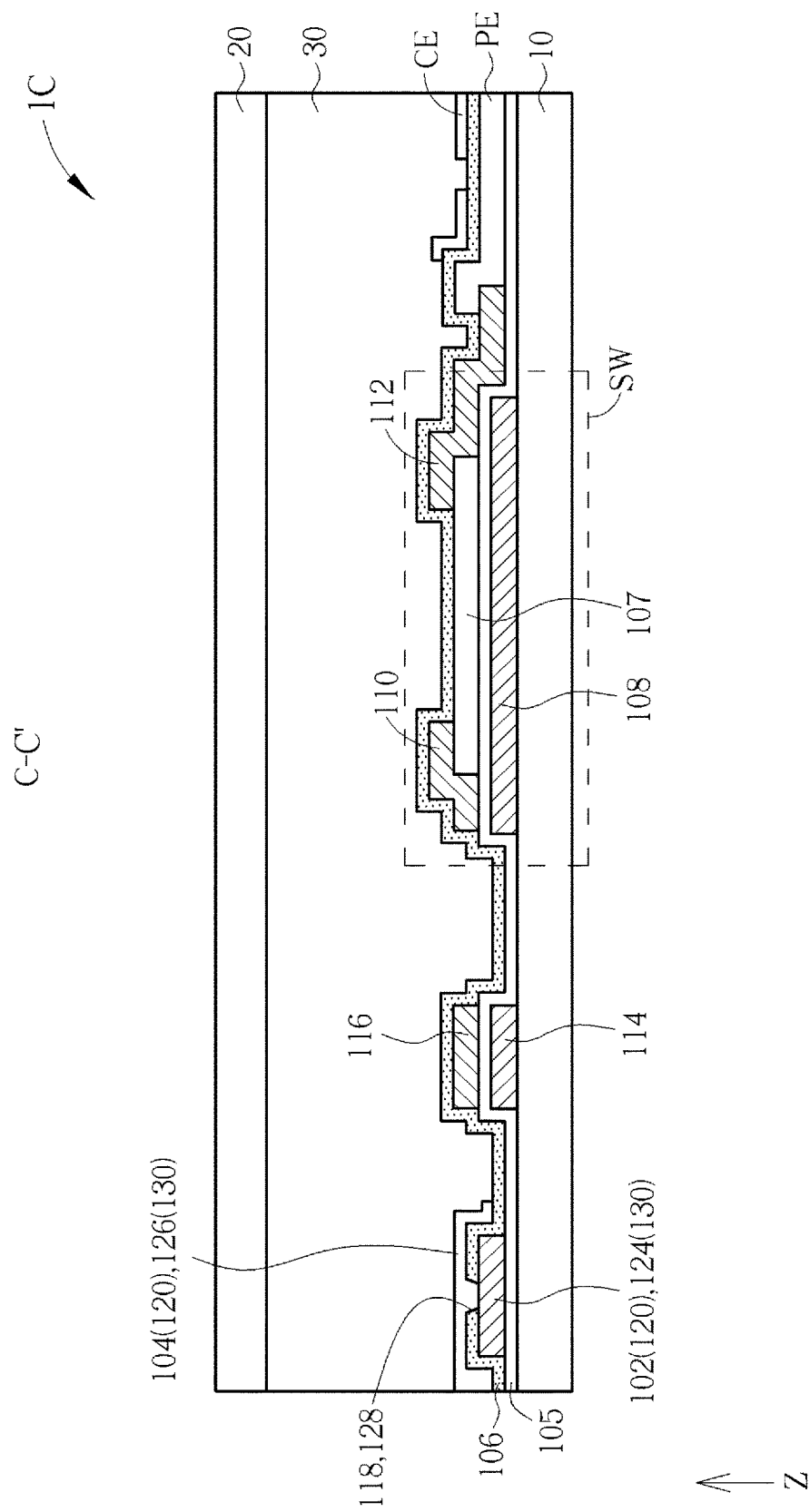
FIG. 9 shows a schematic cross-sectional view along a cut line C-C' of FIG. 8 of the array substrate according to the second alternative embodiment of the first embodiment of the present disclosure.

Referring to FIG. 8 and FIG. 9, FIG. 8 shows an enlarged schematic view of the pixels positioned at the first region or the second region according to a second alternative embodiment of the first embodiment of the present disclosure, and FIG. 9 shows a schematic cross-sectional view along a cut line C-C' of FIG. 8 of the array substrate according to the second alternative embodiment of the first embodiment of the present disclosure, wherein the cross-sectional view of the array substrate of FIG. 9 also shows the corresponding opposite substrate 20 and the display medium layer 30. As shown in FIG. 8 and FIG. 9, this embodiment is different from the first embodiment in that, the first sensing line segment 102 and the data line 116 may be in the same conductive-pattern layer (for example, a second conductive-pattern layer), but the first sensing line segment 102 and the data line 116 are separate from each other.

In particular, the gate dielectric layer 105 in this embodiment is disposed on the gate electrode 108 and the array substrate 10, and the first sensing line segment 102 is disposed on the gate dielectric layer 105. The insulating layer 106 is disposed on the first sensing line segment 102, the drain electrode 112, the source electrode 110, the channel layer 107, the gate dielectric layer 105, and the pixel electrode PE. The first connecting electrode 104 and the common electrode CE are disposed on the insulating layer 106, and the first connecting electrode 104 and the common electrode CE may be in the same conductive-pattern layer. Therefore, the first connecting electrode 104 may be connected to the exposed portion of the first sensing line segment 102 via the first opening 118 in the insulating layer 106 to form the first sensing line 120.

On the other hand, the second sensing line segment 124 and the data line 116 also may be in the same conductive-pattern layer, but the second sensing line segment 124 and the data line 116 are separate from each other, and the second sensing line segment 124 and the first sensing line segment 102 are separate from each other. The relative positions of the second sensing line segment 124, the second connecting electrode 126 and other devices may be same as those of the first sensing line segment 102, the first connecting electrode 104 and other devices (see also FIG. 8 and FIG. 9), and are not repeatedly described. In addition, the scan line 114 in the present alternative embodiment may partially overlap with or not overlap with the first sensing line segment 102 and the second sensing line segment 124 in the vertical projection direction Z, respectively, detailed implementation of which may be similar to the first embodiment and is not repeatedly described. Furthermore, the remaining features of the touch display panel 1C of the present alternative embodiment may be the same as those of the first embodiment (see also FIG. 1 to FIG. 5), and are not repeatedly described.

Figure 10:
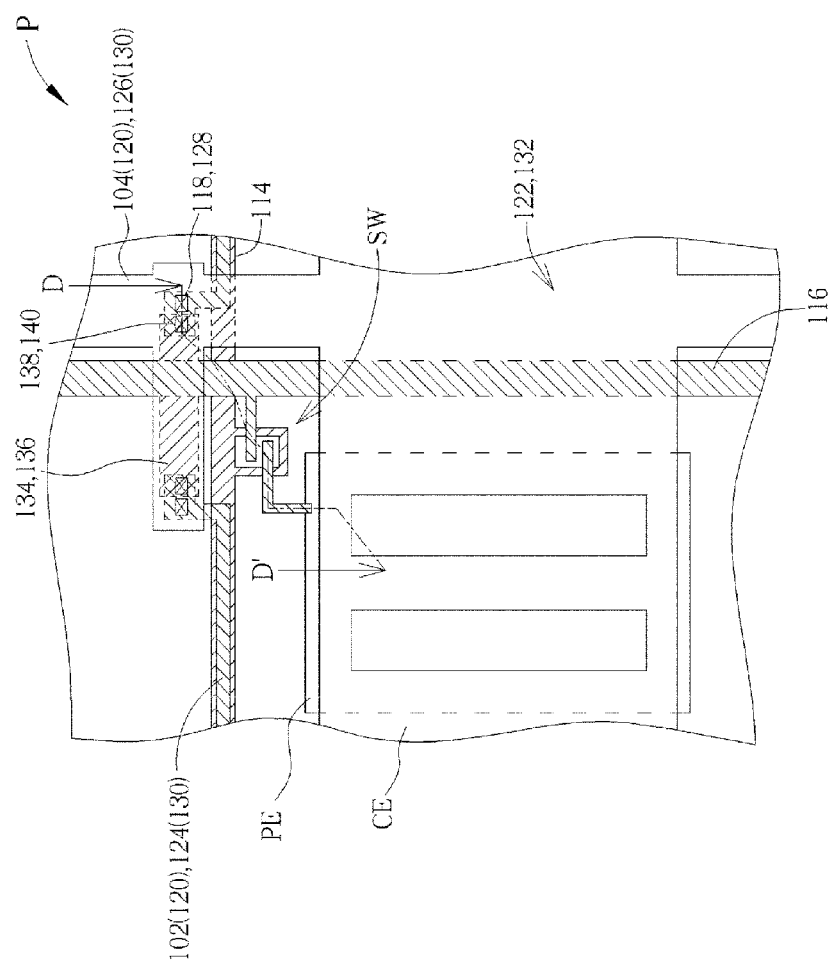
FIG. 10 shows an enlarged schematic view of the pixels positioned at the first region or the second region according to a third alternative embodiment of the first embodiment of the present disclosure.
Figure 11:
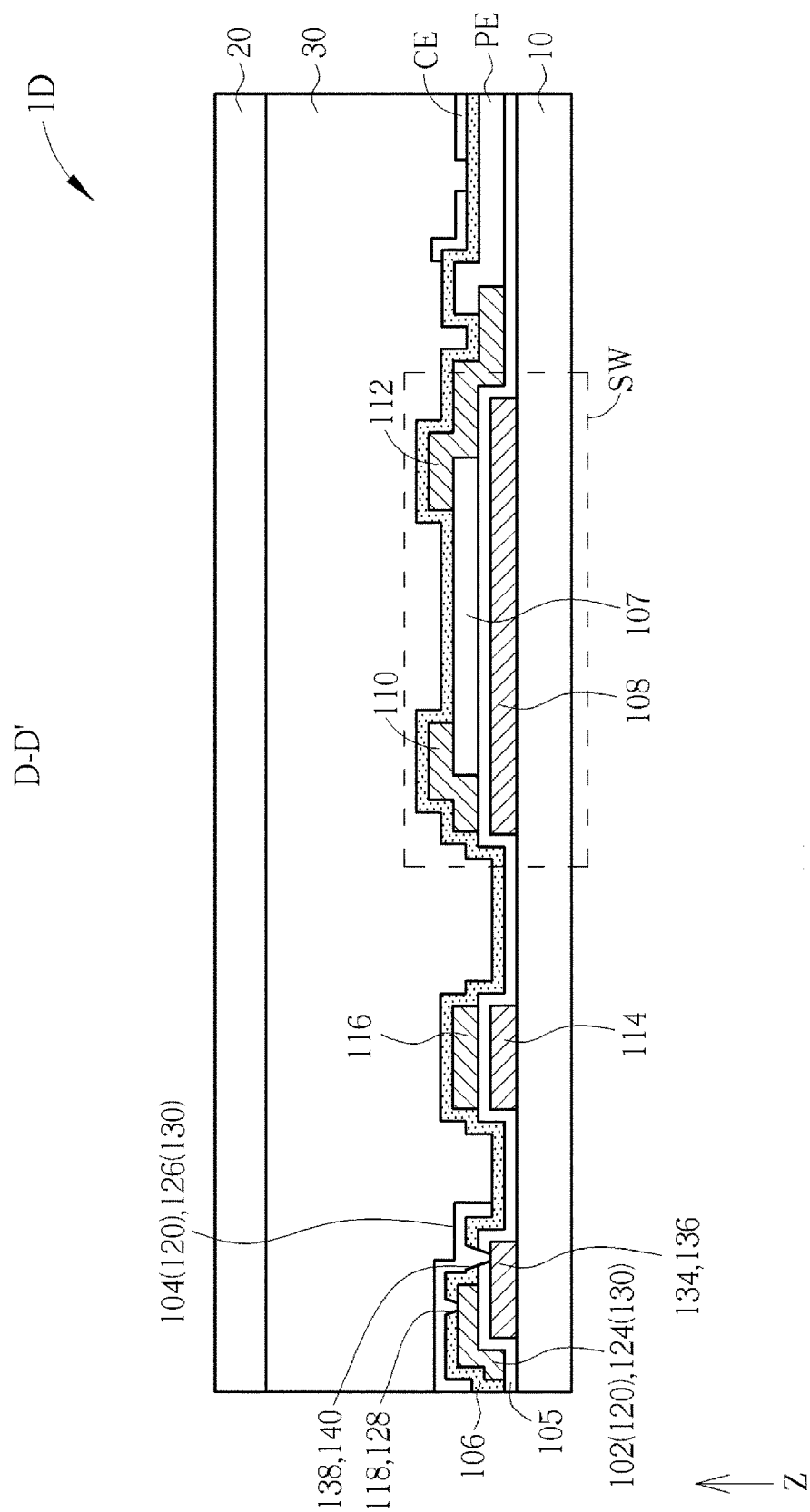
FIG. 11 shows a schematic cross-sectional view along a cut line D-D' of FIG. 10 of the array substrate according to the third alternative embodiment of the first embodiment of the present disclosure.

Referring to FIG. 10 and FIG. 11, FIG. 10 shows an enlarged schematic view of the pixels positioned at the first region or the second region according to a third alternative embodiment of the first embodiment of the present disclosure, and FIG. 11 shows a schematic cross-sectional view along a cut line D-D' of FIG. 10 of the array substrate according to the third alternative embodiment of the first embodiment of the present disclosure, wherein the cross-sectional view of the array substrate of FIG. 11 also shows the corresponding opposite substrate 20 and the display medium layer 30. As shown in FIG. 10 and FIG. 11, unlike the second alternative embodiment, the touch display panel 1D of the present alternative embodiment further comprises a first auxiliary electrode (or namely first assistant electrode) 134 disposed below the insulating layer 106, and the common electrode CE at the first region R1 is connected to the first auxiliary electrode 134 through the first connecting electrode 104, and the first auxiliary electrode 134 is not connected to any of the active device SW, the scan line 114, the data line 116, and the second sensing electrode 132; namely, the first auxiliary electrode 134 is separate from the active device SW, the scan line 114, the data line 116, and the second sensing electrode 132. The first auxiliary electrode 134 may be disposed between two adjacent first sensing line segments 102 in the first region R1 and the third region R3 and partially overlap with the first sensing line segments 102 in the vertical projection direction Z, the first auxiliary electrode 134 may at least partially overlap with the first connecting electrode 104 in the vertical projection direction Z, and the first connecting electrode 104 may be connected to the first auxiliary electrode 134 via a third opening 138 in the insulating layer 106 and the gate dielectric layer 105.

On the other hand, the touch display panel 1D further comprises a second auxiliary electrode 136 disposed below the insulating layer 106, and the common electrode CE at the third region R3 is connected to the second auxiliary electrode (or namely second assistant electrode) 136 through the second connecting electrode 126, and the second auxiliary electrode 136 is not connected to any of the active device SW, the scan line 114, the data line 116, and the first sensing electrode 122; namely, the second auxiliary electrode 136 is separate from the active device SW, the scan line 114, the data line 116, and the first sensing electrode 122. The second auxiliary electrode 136 may be disposed between two adjacent second sensing line segments 124 in the third region R3 and partially overlap with the second sensing line segments 124 in the vertical projection direction Z, and the second auxiliary electrode 136 at least partially overlaps with the second connecting electrode 126 in the vertical projection direction Z. The second connecting electrode 126 may be connected to the second auxiliary electrode 136 via a fourth opening 140 in the insulating layer 106 and the gate dielectric layer 105. In addition, the relative position of the second auxiliary electrode 136 to other devices may be the same as that of the first auxiliary electrode 134 to other devices, as can be referred to in FIG. 10 and FIG. 11.

In this embodiment, the first auxiliary electrode 134, the second auxiliary electrode 136 and the scan line 114 may be in the same conductive-pattern layer (for example, a first conductive-pattern layer), and the materials thereof may include, for example, metal, alloy or other suitable materials, or stacks of the aforementioned materials. In addition, neither the first auxiliary electrode 134 nor the second auxiliary electrode 136 is connected with the scan line 114; namely, the first auxiliary electrode 134, the second auxiliary electrode 136 and the scan line 114 are separate from each other. In particular, the first auxiliary electrode 134 and the second auxiliary electrode 136 are not connected to each other; namely, the first auxiliary electrode 134 and the second auxiliary electrode 136 are separate from each other. The first auxiliary electrode 134 and the scan line 114 are not connected to each other; namely, the first auxiliary electrode 134 and the scan line 114 are separate from each other. The second auxiliary electrode 136 and the scan line 114 are not connected to each other; namely, the second auxiliary electrode 136 and the scan line 114 are separate from each other. As such, the first sensing line 120 and the second sensing line 130 in the present alternative embodiment may be connected to the first auxiliary electrode 134 and the second auxiliary electrode 136 respectively, and the materials of the first auxiliary electrode 134 and the second auxiliary electrode 136 may be metal, alloy or other suitable materials, or stacks of the aforementioned materials. Thus, the overall resistance of the first sensing line 120 and the second sensing line 130 may be further reduced.

It is also to be noted that, the scan line 114 in the present alternative embodiment may partially overlap with or not overlap with the first sensing line segment 102 and the second sensing line segment 124 in the vertical projection direction Z, respectively, detailed implementation of which may be similar to that of the first embodiment and is not repeatedly described. Furthermore, the remaining features of the touch display panel 1D of the this embodiment may be the same as those of the first embodiment and the second alternative embodiment thereof (see also FIG. 1-5 and FIG. 8-9), and are not repeatedly described herein.

Figure 12:
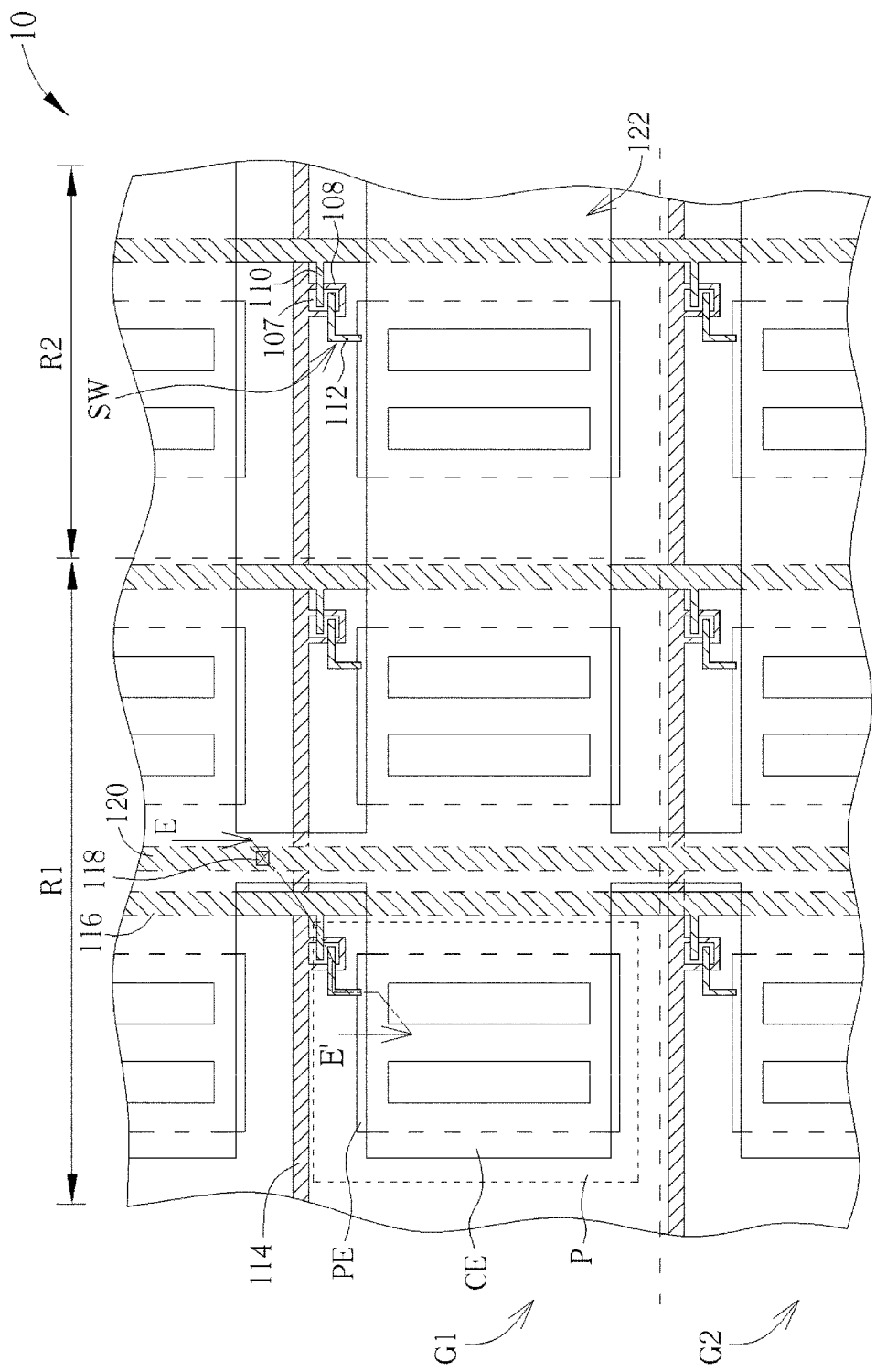
FIG. 12 shows an enlarged schematic view of the X region in FIG. 2 of the array substrate according to a second embodiment of the present disclosure.
Figure 13:
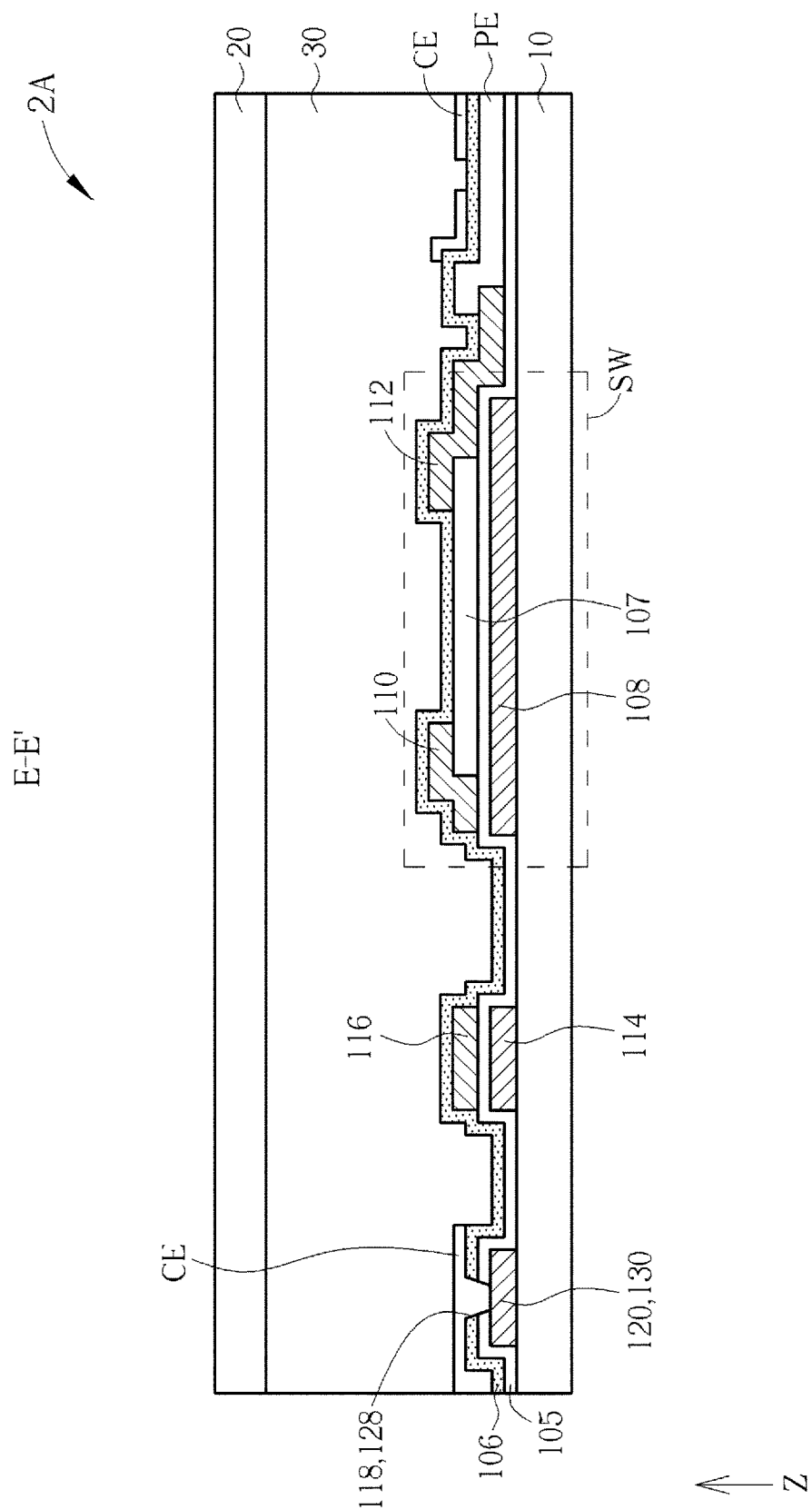
FIG. 13 shows a schematic cross-sectional view along a cut line E-E' of FIG. 12 of the array substrate according to the second embodiment of the present disclosure.
Figure 14:
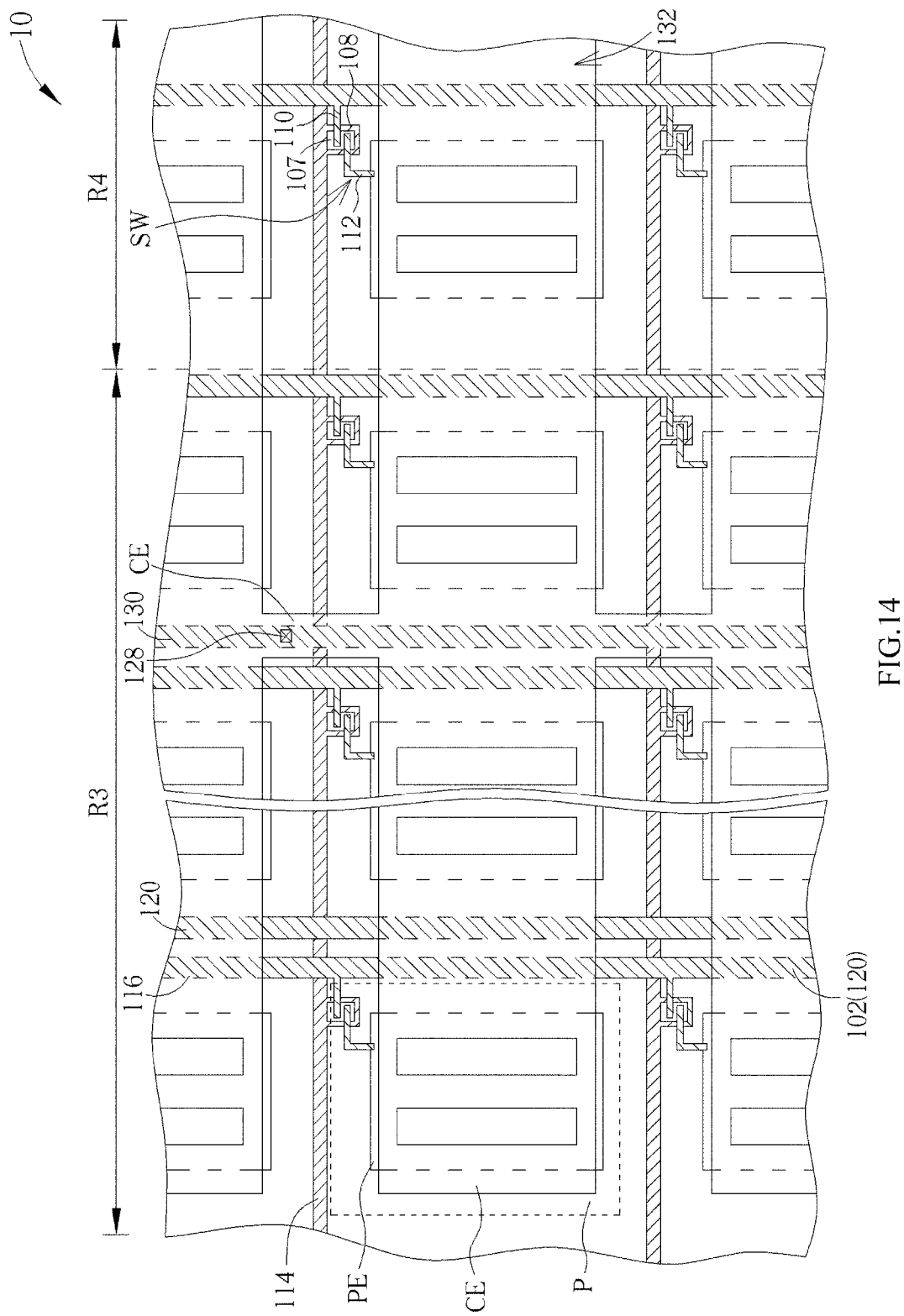
FIG. 14 shows an enlarged schematic view of the Y region in FIG. 2 of the array substrate according to the second embodiment of the present disclosure.

Referring to FIG. 12 to FIG. 14, FIG. 12 shows an enlarged schematic view of the X region in FIG. 2 of the array substrate according to a second embodiment of the present disclosure, FIG. 13 shows a schematic cross-sectional view along a cut line E-E' of FIG. 12 of the array substrate according to the second embodiment of the present disclosure, and FIG. 14 shows an enlarged schematic view of the Y region in FIG. 2 of the array substrate according to the second embodiment of the present disclosure, wherein the cross-sectional view of the array substrate of FIG. 13 also shows the corresponding opposite substrate 20 and the display medium layer 30. As shown in FIG. 2, FIG. 12 and FIG. 13, the touch display panel 2A of the present embodiment comprises a plurality of pixels P, a first sensing line 120 and an insulating layer 106. The pixels P are divided into a first group G1 and a second group G2, the first group G1 has a first region R1 and a second region R2, the second group G2 comprises a third region R3 and a fourth region R4, each of the pixels P comprises an active device SW, a pixel electrode PE and a common electrode CE, the active device SW has a gate electrode 108, a source electrode 110 and a drain electrode 112, the gate electrode 108 is connected to a scan line 114, the source electrode 110 is connected to a data line 116, and the drain electrode 112 is connected to the pixel electrode PE. The first sensing line 120 is disposed in a portion of the pixels P of the first region R1 and extends through a portion of the pixels P of the third region R3.

In the present embodiment, the first sensing line 120 and the data line 116 are generally kept at a distance from each other; namely, the first sensing line 120 and the data line 116 are separate from each other. In other words, the first sensing line 120 does not overlap with the data line 116 in the vertical projection direction Z. The insulating layer 106 is sandwiched between the first sensing line 120 and the common electrode CE, and the insulating layer 106 comprises at least one first opening 118 for exposing a portion of the first sensing line 120, wherein the common electrode CE at the first region R1 is connected to the first sensing line 120, the common electrode CE at the second region R2 is connected to the common electrode CE at the first region R1 to form a first sensing electrode 122, and the common electrode CE at the second region R2 is not directly connected to the first sensing line 120; namely, the common electrode CE at the second region R2 is connected to the first sensing line 120 through the common electrode CE at the first region R1. It should be noted that, the present embodiment is different from the first embodiment in that, the first sensing line 120 does not comprise the first connecting electrode and the first sensing line segment, and instead is directly formed by a conductive-pattern layer.

As shown in FIG. 2, FIG. 13, and FIG. 14, the touch display panel 2A of the present embodiment further comprises a second sensing line 130 disposed in another portion of the pixels P of the third region R3, and the second sensing line 130 and the data line 116 are generally kept at a distance from each other; namely, the second sensing line 130 and the data line 116 are separate from each other. In other words, the second sensing line 130 does not overlap with the data line 116 in the vertical projection direction Z. The insulating layer 106 is further sandwiched between the common electrode CE and the second sensing line 130, and the insulating layer 106 further comprises at least one second opening 128 for exposing a portion of the second sensing line 130. The relative position of the second sensing line 130 to the insulating layer 106 may be the same as that of the first sensing line 120 to the insulating layer 106, as can be referred to in FIG. 13. The common electrode CE at the third region R3 is connected to the second sensing line 130, for example, through the second opening 128 in the insulating layer 106. The common electrode CE at the fourth region R4 is connected to the common electrode CE at the third region R3 to form a second sensing electrode 132, and the common electrode CE at the fourth region R4 is not directly connected to the second sensing line 130; namely, the common electrode CE at the fourth region R4 is connected to the second sensing line 130 through the common electrode CE at the third region R3. It should be noted that, the present embodiment is different from the first embodiment in that, the second sensing line 130 does not comprise the second connecting electrode and the second sensing line segment, and instead is directly formed by a conductive-pattern layer.

In addition, in the present embodiment, the first sensing line 120, the second sensing line 130 and the data line 116 are in the same conductive-pattern layer (for example, a second conductive-pattern layer), and neither the first sensing line 120 nor the second sensing line 130 is connected with the data line 116; namely, the first sensing line 120, the second sensing line 130 and the data line 116 are separate from each other. In particular, the first sensing line 120 and the second sensing line 130 may be not connected to each other; namely, the first sensing line 120 and the second sensing line 130 are separate from each other. The first sensing line 120 and the data line 116 may be not connected to each other; namely, the first sensing line 120 and the data line 116 are separate from each other. The second sensing line 130 and the data line 116 may be not connected to each other; namely, the second sensing line 130 and the data line 116 are separate from each other.

In addition, the first sensing line 120 and the second sensing line 130 are each kept at a distance from the data line 116, such that neither the first sensing line 120 nor the second sensing line 130 overlaps with the data line 116 in the vertical projection direction Z. In particular, the first sensing line 120 does not overlap with the second sensing line 130 in the vertical projection direction Z, the first sensing line 120 does not overlap with the data line 116 in the vertical projection direction Z, and the second sensing line 130 does not overlap with the data line 116 in the vertical projection direction Z. It is also to be noted that, the active device SW is neither present on the first sensing line 120 nor on the second sensing line 130, or namely the first sensing line 120 and the second sensing 130 are both not exist the active device SW. Alternatively, for example, the first sensing line 120 and the second sensing line 130 may each be not connected to the active device SW.

For the touch display panel 2A of the present embodiment, since the sensing lines may be the in same conductive-pattern layer as the data line 116, the touch devices may be made together with the architecture of the display panel, and an additional conductive layer is not required for making the touch devices, thereby reducing the overall complexity and manufacture cost of the process. Moreover, direct sensing may be performed without active device SW on the sensing lines of the touch display panel 2A, whereby an increase in number of the active device SW required in the touch display panel 2A may be avoided and also the overall complexity and manufacture cost of the process may be reduced.

Figure 15:
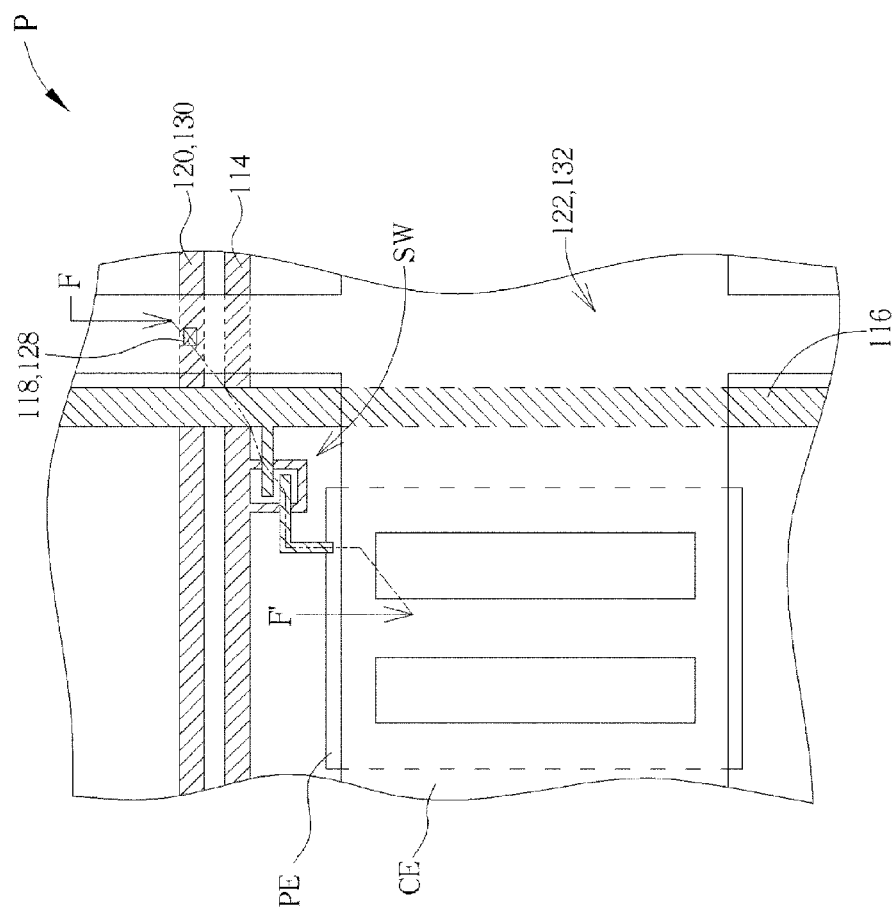
FIG. 15 shows an enlarged schematic view of the pixels positioned at the first region or the second region according to a first alternative embodiment of the second embodiment of the present disclosure.
Figure 16:
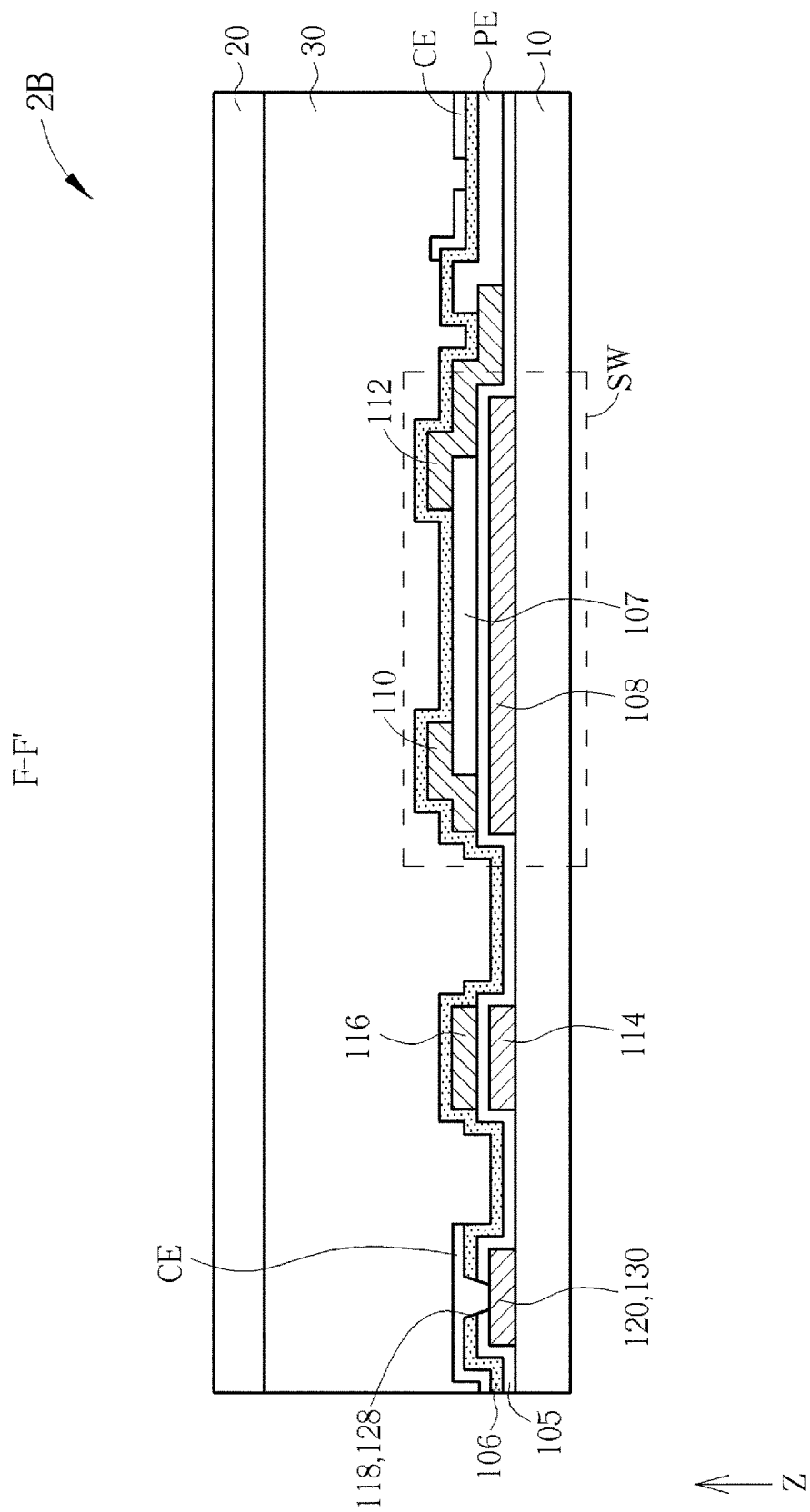
FIG. 16 shows a schematic cross-sectional view along a cut line F-F' of FIG. 15 of the array substrate according to the first alternative embodiment of the second embodiment of the present disclosure.

Referring to FIG. 15 and FIG. 16, FIG. 15 shows an enlarged schematic view of the pixels positioned at the first region or the second region according to a first alternative embodiment of the second embodiment of the present disclosure, and FIG. 16 shows a schematic cross-sectional view along a cut line F-F' of FIG. 15 of the array substrate according to the first alternative embodiment of the second embodiment of the present disclosure, wherein the cross-sectional view of the array substrate of FIG. 16 also shows the corresponding opposite substrate 20 and the display medium layer 30. As shown in FIG. 15 and FIG. 16, the present alternative embodiment is different from the second embodiment in that, the first sensing line 120 and the scan line 114 are in the same conductive-pattern layer (for example, a first conductive-pattern layer), and the first sensing line 120 and the scan line 114 are not connected to each other; namely, the first sensing line 120 and the scan line 114 are separate from each other, and the first sensing line 120 does not overlap with the scan line 114 in the vertical projection direction Z. In particular, the first sensing line 120 and the scan line 114 are in the same conductive-pattern layer, the insulating layer 106 and the gate dielectric layer 105 may be disposed above the first sensing line 120, and the common electrode CE may be disposed on the insulating layer 106. The insulating layer 106 comprises at least one first opening 118, wherein the first opening 118 may additionally pass through the gate dielectric layer 105 to expose a portion of the first sensing line 120 and enable the common electrode CE to be connected to the first sensing line 120. However, the present disclosure is not limited thereto. On the other hand, the second sensing line 130 also may be in the same conductive-pattern layer (for example, a first conductive-pattern layer) as the scan line 114, and the relative position of the second sensing line 130 to other devices may be the same as that of the first sensing line 120 to other devices (see also FIG. 15 and FIG. 16), and is not repeatedly described.

Figure 17:
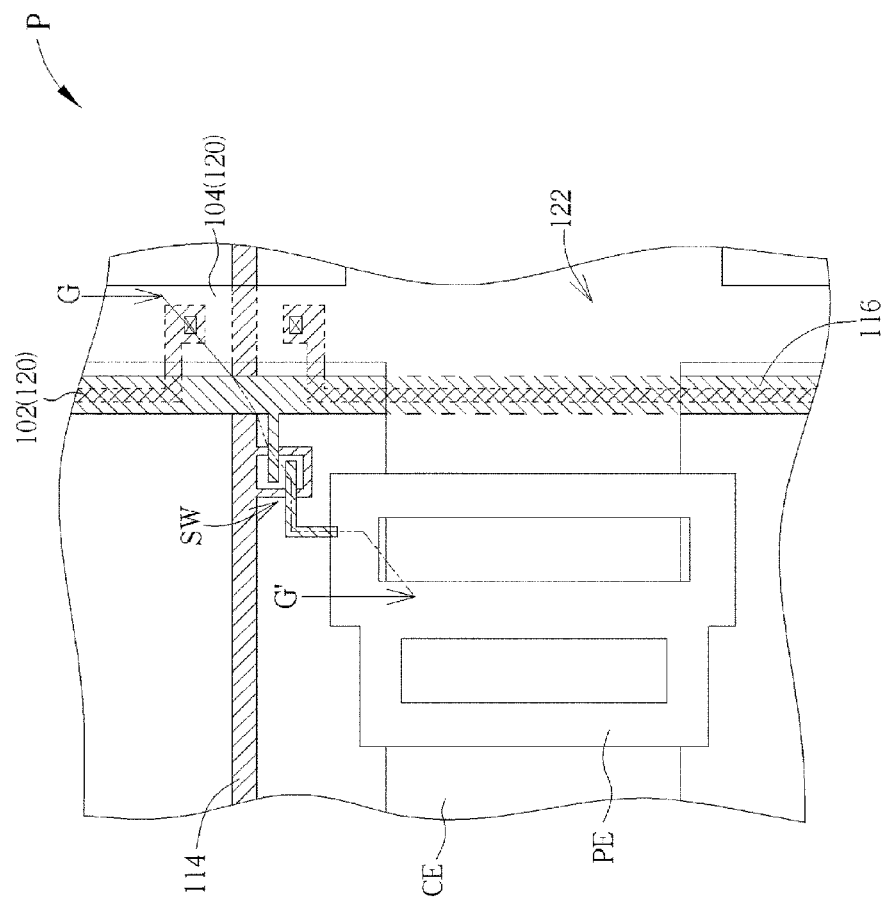
FIG. 17 shows an enlarged schematic view of the pixels positioned at the first region according to a third embodiment of the present disclosure.
Figure 18:
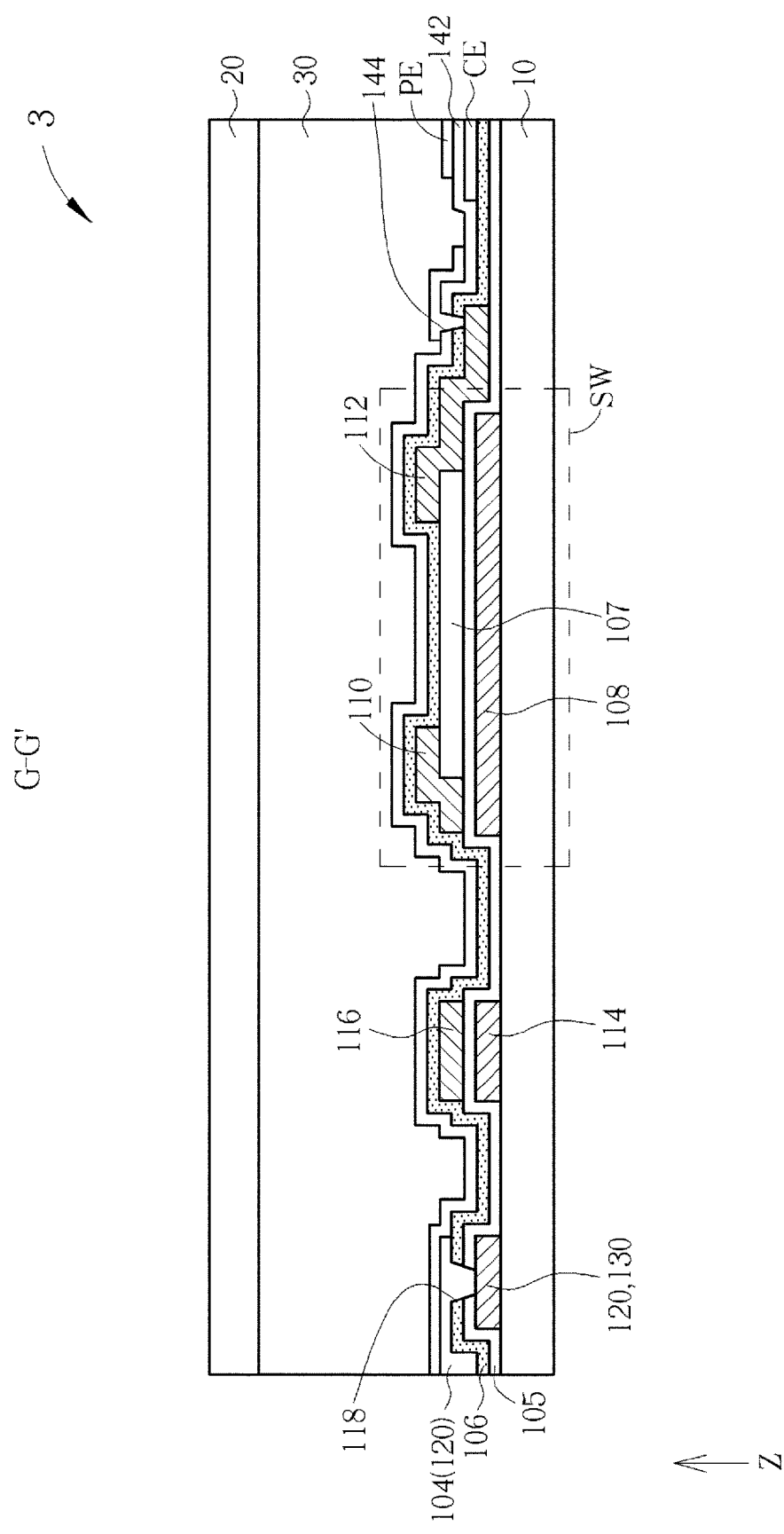
FIG. 18 shows a schematic cross-sectional view along a cut line G-G' of FIG. 17 of the array substrate according to the third embodiment of the present disclosure.

Referring to FIG. 17 and FIG. 18, FIG. 17 shows an enlarged schematic view of the pixels positioned at the first region according to a third embodiment of the present disclosure, and FIG. 18 shows a schematic cross-sectional view along a cut line G-G' of FIG. 17 of the array substrate according to the third embodiment of the present disclosure, wherein the cross-sectional view of the array substrate of FIG. 18 also shows the corresponding opposite substrate 20 and the display medium layer 30. As shown in FIG. 17 and FIG. 18, the present embodiment is different from the first embodiment in that, the pixel electrode PE is located above the common electrode CE, and the touch display panel 3 additionally comprises a dielectric layer 142 sandwiched between the pixel electrode PE and the common electrode CE; namely, in the first embodiment, the pixel electrode PE is located below the common electrode CE, and the touch display panel comprises the insulating layer 106 sandwiched between the pixel electrode PE and the common electrode CE. In particular, the dielectric layer 142 and the insulating layer 106 have a fifth opening 144, such that the pixel electrode PE can be connected to the drain electrode 112.

In addition, materials of the dielectric layer 142 may include inorganic insulating materials, organic insulating materials, or stacks of the aforementioned materials. The inorganic insulating materials may be for example silicon oxide, silicon nitride, silicon oxynitride, or other suitable materials, or stacks of the aforementioned materials, and the organic insulating materials may be for example acrylic, photoresists, epoxies, or other suitable materials, or stacks of the aforementioned materials. However, the present disclosure is not limited thereto. The remaining features of the touch display panel 3 of the present embodiment may be the same as those of the first embodiment (see also FIG. 2 to FIG. 5), and are not repeatedly described. It is also to be noted that, the touch display panel 3 of the present embodiment is also applicable to the first embodiment, the second embodiment and the alternative embodiments thereof, and this is not repeatedly described herein.

To sum up, for the touch display panels of the present disclosure, since the sensing lines are formed by the sensing line segments and the connecting electrodes, and the sensing line segments may be in the same conductive-pattern layer as the scan line or the data line, the connecting electrodes may be in the same conductive-pattern layer as the common electrode. On the other hand, the sensing lines of the touch display panel of the present disclosure also may be directly formed by the same conductive-pattern layer of the scan line or the data line. In other words, for the touch display panel, the touch devices may be made together with the architecture of the display panel, and thus an additional conductive layer is not required for making the touch devices, thereby reducing the overall complexity and manufacture cost of the process. Furthermore, the sensing lines may additionally be connected to the auxiliary electrodes, such that the overall resistance of the sensing lines may be further reduced. Moreover, direct sensing may be performed without an active device on the sensing lines of the touch display panels, whereby an increase in number of the active device required in the touch display panels may be avoided and also the overall complexity and manufacture cost of the process may be reduced. On the other hand, the shape of the sensing lines can allow the sensing lines to keep from (or keep away from, or avoid) the active device, such that the effect of the sensing lines on the active device can be reduced; namely, signal interference with the active device from the sensing lines that results in easy turn-on and uneasy turn-off of the active device is avoided.

The above description only provides preferred embodiments of the present disclosure, and all equivalent changes and modifications made according to the claims of the present disclosure falls within the scope of the present disclosure.

What is claimed is:

1. A touch display panel, comprising:
a plurality of pixels divided into a first group and a second group, wherein the first group comprises a first region and a second region, the second group comprises a third region and a fourth region, each of the pixels comprises an active device, a pixel electrode and a common electrode, the active device comprises a gate electrode, a source electrode and a drain electrode, the gate electrode is connected to a scan line, the source electrode is connected to a data line, and the drain electrode is connected to the pixel electrode;
a first sensing line segment disposed in a portion of the pixels of the first region and a portion of the pixels of the third region;
a first connecting electrode; and
an insulating layer sandwiched between the first connecting electrode and the first sensing line segment, the insulating layer comprising at least one first opening exposing a portion of the first sensing line segment or a portion of the first connecting electrode, wherein the first connecting electrode is connected to the portion of the first sensing line segment via the first opening to form a first sensing line, the common electrode at the first region is connected to the first connecting electrode, the common electrode at the second region is connected to the common electrode at the first region to form a first sensing electrode, and the common electrode at the second region is not directly connected to the first connecting electrode.

2. The touch display panel according to claim 1, further comprising:
a second sensing line segment disposed in another portion of the pixels of the third region; and
a second connecting electrode, wherein the insulating layer is further sandwiched between the second connecting electrode and the second sensing line segment, the insulating layer further comprising at least one second opening exposes a portion of the second sensing line segment or a portion of the second connecting electrode, wherein the second connecting electrode is connected to the portion of the second sensing line segment via the second opening to form a second sensing line, the common electrode at the third region is connected to the second connecting electrode, the common electrode at the fourth region is connected to the common electrode at the third region to form a second sensing electrode, and the common electrode at the fourth region is not directly connected to the second connecting electrode.

3. The touch display panel according to claim 2, wherein the insulating layer covers the first sensing line segment and the second sensing line segment, and exposes the portion of the first sensing line segment and the portion of the second sensing line segment via the first opening and the second opening, respectively;

the first connecting electrode is disposed on the insulating layer and is connected to the exposed portion of the first sensing line segment; and the second connecting electrode is disposed on the insulating layer and is connected to the exposed portion of the second sensing line segment.

4. The touch display panel according to claim 2, wherein the first sensing electrode is not connected to the second sensing electrode, the first sensing line is not connected to the second sensing line, and the common electrode at the third region is not connected to the first sensing line.

5. The touch display panel according to claim 2, further comprising:

a first auxiliary electrode disposed below the insulating layer, wherein the common electrode at the first region is connected to the first auxiliary electrode through the first connecting electrode, and the first auxiliary electrode is not connected to any of the active device, the scan line, the data line, and the second sensing electrode.

6. The touch display panel according to claim 2, further comprising:

a second auxiliary electrode disposed below the insulating layer, wherein the common electrode at the third region is connected to the second auxiliary electrode through the second connecting electrode, and the second auxiliary electrode is not connected to any of the active device, the scan line, the data line, and the first sensing electrode.

7. The touch display panel according to claim 2, wherein the active device is neither present on the first sensing line nor on the second sensing line.

8. The touch display panel according to claim 2, wherein at least one of the first sensing line and the second sensing line keeps away from the active device.

9. The touch display panel according to claim 2, wherein the data line overlaps with the portion of the first sensing line segment and the data line does not overlap with the portion of the second sensing line segment.

10. The touch display panel according to claim 2, wherein the scan line overlaps with the portion of the first sensing line segment and the scan line does not overlap with the portion of the second sensing line segment.

11. The touch display panel according to claim 2, wherein the data line overlaps with the portion of the first sensing line segment and the portion of the second sensing line segment.

12. The touch display panel according to claim 2, wherein the scan line overlaps with the portion of the first sensing line segment and the portion of the second sensing line segment.

13. The touch display panel according to claim 2, wherein the data line does not overlaps with the portion of the first sensing line segment and the portion of the second sensing line segment.

14. The touch display panel according to claim 2, wherein the scan line does not overlaps with the portion of the first sensing line segment and the portion of the second sensing line segment.

15. The touch display panel according to claim 3, wherein the first sensing line segment, the second sensing line segment and the scan line are in a same conductive-pattern layer, and neither the first sensing line segment nor the second sensing line segment is connected with the scan line.

16. The touch display panel according to claim 15, further comprising a first auxiliary electrode and a second auxiliary electrode disposed below the insulating layer, wherein the first auxiliary electrode, the second auxiliary electrode and the data line are in a same conductive-pattern layer, and neither the first auxiliary electrode nor the second auxiliary electrode is connected with the data line.

17. The touch display panel according to claim 3, wherein the first sensing line segment, the second sensing line segment and the data line are in a same conductive-pattern layer, and neither the first sensing line segment nor the second sensing line segment is connected with the data line.

18. The touch display panel according to claim 17, further comprising a first auxiliary electrode and a second auxiliary electrode disposed below the insulating layer, wherein the first auxiliary electrode, the second auxiliary electrode and the scan line are in a same conductive-pattern layer, and neither the first auxiliary electrode nor the second auxiliary electrode is connected with the scan line.

19. A touch display panel, comprising:

a plurality of pixels divided into a first group and a second group, wherein the first group comprises a first region and a second region, the second group comprises a third region and a fourth region, each of the pixels comprises an active device, a pixel electrode and a common electrode, the active device comprises a gate electrode, a source electrode and a drain electrode, the gate electrode is connected to a scan line, the source electrode is connected to a data line, and the drain electrode is connected to the pixel electrode;

a first sensing line disposed in a portion of the pixels of the first region and extending through a portion of the pixels of the third region; and an insulating layer sandwiched between the first sensing line and the common electrode, the insulating layer comprising at least one first opening exposing a portion of the first sensing line, wherein the common electrode at the first region is connected to the first sensing line, the common electrode at the second region is connected to the common electrode at the first region to form a first sensing electrode, and the common electrode at the second region is not directly connected to the first sensing line.

20. The touch display panel according to claim 19, further comprising:

a second sensing line disposed in another portion of the pixels of the third region, wherein the insulating layer is further sandwiched between the common electrode and the second sensing line, the insulating layer further comprising at least one second opening exposes a portion of the second sensing line, wherein the common electrode at the third region is connected to the second sensing line, the common electrode at the fourth region is connected to the common electrode at the third region to form a second sensing electrode, and the common electrode at the fourth region is not directly connected to the second sensing line.

21. The touch display panel according to claim 6, wherein the active device is neither present on the first sensing line nor on the second sensing line.

22. The touch display panel according to claim 6, wherein at least one of the first sensing line and the second sensing line keeps away from the active device.

23. The touch display panel according to claim 6, wherein the first sensing line, the second sensing line and the scan line are in a same conductive-pattern layer, neither the first sensing line nor the second sensing line is connected with the scan line, and neither the first sensing line nor the second sensing line overlaps with the scan line.

24. The touch display panel according to claim 6, wherein the first sensing line, the second sensing line and the data line are in a same conductive-pattern layer, neither the first sensing line nor the second sensing line is connected with the data line, and neither the first sensing line nor the second sensing line overlaps with the data line.

\* \* \* \* \*